US011055338B2

(12) United States Patent
Kajinaga et al.

(10) Patent No.: US 11,055,338 B2
(45) Date of Patent: *Jul. 6, 2021

(54) DYNAMIC FACET TREE GENERATION

(71) Applicant: INTERNATIONAL BUSINESS MACHINES CORPORATION, Armonk, NY (US)

(72) Inventors: Yasumasa Kajinaga, Funabashi (JP); Yutaka Moriya, Tokyo (JP); Yuichi Suzuki, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/695,460

(22) Filed: Nov. 26, 2019

(65) Prior Publication Data

US 2020/0097531 A1 Mar. 26, 2020

Related U.S. Application Data

(63) Continuation of application No. 15/058,189, filed on Mar. 2, 2016, now Pat. No. 10,509,855.

(51) Int. Cl.
*G06F 16/36* (2019.01)
*G06F 40/169* (2020.01)
(Continued)

(52) U.S. Cl.
CPC ............ *G06F 16/36* (2019.01); *G06F 40/137* (2020.01); *G06F 40/14* (2020.01); *G06F 40/169* (2020.01); *G06F 40/284* (2020.01)

(58) Field of Classification Search
CPC ...... G06F 40/137; G06F 40/14; G06F 40/169; G06F 40/284; G06F 1/36; G06F 16/36
See application file for complete search history.

(56) References Cited

U.S. PATENT DOCUMENTS 2,269,353 A   1/1942  Chesterman
6,519,586 B2  2/2003  Anick
(Continued)

OTHER PUBLICATIONS

Ensan, Alireza "Matchmaking Through Semantic Annotation and Similarity Measurements" IEEE 2012 (Year: 2102).*
IBM: List of IBM Patents or Patent Applications Treated as Related (Appendix P), Dec. 27, 2019, 2 pages.
(Continued)

*Primary Examiner* — Stephen S Hong
*Assistant Examiner* — Nicholas Hasty
(74) *Attorney, Agent, or Firm* — Robert C. Bunker

(57) ABSTRACT

Embodiments of the present invention include generating a facet tree based on words found in one or more documents, the facet tree being a tree data structure that defines hierarchical relationships between a plurality of words. The method may further include calculating a degree of similarity between a first word and a second word based on similarity of usage of the first word and the second word in the one or more documents, and generate a facet tree based on the degree of similarity. The method may further include, for each of one or more candidate words in the one or more documents, calculating a degree of correlation between a co-occurrence of two or more existing facet tree entries in a document and an occurrence of the candidate word in the document, and updating the facet tree on the basis of the one or more degrees of correlation.

15 Claims, 18 Drawing Sheets

(51) Int. Cl.
*G06F 40/14* (2020.01)
*G06F 40/137* (2020.01)
*G06F 40/284* (2020.01)

(56) References Cited

U.S. PATENT DOCUMENTS

| | | | |
|---|---|---|---|
| 7,392,250 | B1 | 6/2008 | Dash |
| 7,730,059 | B2 | 6/2010 | Behnen |
| 8,032,532 | B2 | 10/2011 | Broder |
| 8,495,001 | B2* | 7/2013 | Sweeney .................. G06F 16/36 706/55 |
| 10,509,855 | B2 | 12/2019 | Kajinaga |
| 2011/0161073 | A1* | 6/2011 | Lesher .................. G06F 40/247 704/10 |
| 2014/0079297 | A1 | 3/2014 | Tadayon |
| 2015/0012529 | A1 | 1/2015 | Emanuel |
| 2015/0278313 | A1 | 10/2015 | Acevedo-Aviles |
| 2017/0192959 | A1* | 7/2017 | Lee ........................ G06F 16/313 |
| 2017/0255603 | A1 | 9/2017 | Kajinaga |
| 2019/0012302 | A1* | 1/2019 | MacMahon ....... G06F 17/30882 |

OTHER PUBLICATIONS

Dash et al., "Dynamic faceted search for discovery-driven analysis," CIKM '08, Proceedings of the 17th ACM Conference on Information and Knowledge Management, ACM, New York, NY, USA, Copyright 2008, pp. 3-12.

Elasticsearch, "Aggregations," Learn I Docs, https://www.elastic.co/guide/en/elasticsearch/reference/1.3/search-aggregations.html, Copyright 2016, Printed on Jan. 21, 2016, pp. 1-6.

IBM, "Release Notes—IBM Watson Explorer Analytical Components, Version 10.0," Release Notes for Version 10.0.02, http://www-01.ibm.com/support/docview.wss?uid=swg27042981, Printed on Feb. 23, 2016, pp. 1-12.

Loose-Bits, "Pivot-Faceting (Decision Trees) in Solr 1.4.," Solr Pivot Facets, Sep. 20, 2011, http://loose-bits.com/2011/09/20/pivot-facets-solr.html, Printed on Jan. 21, 2016, pp. 1-14.

Ensan, et al. "Matchmaking Through Semantic Annotation and Similarity Measurement", 2012 25th IEEE Canadian Conference on Electrical and Computer Engineering (CCECE), Apr. 29-May 2, 2012, DOI: 10.1109/CCECE.2012.6334966; Montreal, QC, Canada, Retrieved from the Internet: <https:ieeexplore.ieee.org/document/6334966>.

* cited by examiner

```
<Root>
....President
.....Lincoln (Subject: U.S. Civil War)
.....Lincoln (Publication Date: 1861-1865)
.....Washington (Subject: U.S. Founding)
.....Washington (Publication Date: 1789-1797)
```

*FIG. 3*

Keyword Filter: ...

High Similarity Words (max 1.0)
0.95 Lincoln → President (Category: U.S. Civil War)
0.89 Yoshida → Prime Minister (Category: Japan Politics)
0.80 USA ←→ United States
0.75 Lincoln → President (Date: 1861)

FIG. 12

DYNAMIC FACET TREE GENERATION

BACKGROUND

The present invention relates generally to the field of computing, and more particularly to generating a facet tree.

A facet tree may involve a tree data structure that defines hierarchical relationships between a plurality of words. A facet tree may be used to analyze documents with respect to the words they contain, and with respect to meaningful concepts indicated by the facet tree in relation to those words. However, as a practical matter, creating facet trees is conventionally a time-consuming and difficult task requiring expert knowledge in text analytics and the underlying subject matter of a collection of documents.

SUMMARY

Embodiments of the present invention disclose a method for dynamic facet tree creation. A first aspect of the innovations herein may include a computer readable storage medium having instructions embodied therewith, the instructions executable by a processor to cause the processor to perform operations including calculating a degree of similarity between a first word and a second word based on similarity of usage of the first word and the second word in one or more documents, and updating a facet tree based on the degree of similarity, the facet tree being a tree data structure that defines hierarchical relationships between a plurality of words. Embodiments of the invention that include these features may support updating of facet trees based on words found in one or more documents.

The calculating may include detecting one or more surrounding words appearing with the first word in the one or more documents, detecting one or more surrounding words appearing with the second word in the one or more documents, comparing the one or more surrounding words of the first word with the one or more surrounding words of the second word, and calculating the degree of similarity based on the comparing. Embodiments of the invention that include these features may allow for accurate calculation of the degree of similarity.

The operations may include calculating an additional degree of similarity between the first word and one or more other words, calculating an additional degree of similarity between the second word and the one or more other words, and determining a symmetry score between the first word and the second word based on the additional degrees of similarity of the first word and the second word, and the updating is further based on the symmetry score. Embodiments of the invention that include these features may improve the automation of hierarchical placement in facet tree updating.

The updating may include adding a relationship between the first word and the second word to the facet tree in response to the degree of similarity exceeding a similarity threshold. Embodiments of the invention that include these features may offer users fully automated facet tree updating for ease of use.

The operations may further include outputting the degree of similarity in association with the first word and the second word and receiving a user request to add a relationship between the first word and the second word to the facet tree, and the updating may further include adding the relationship between the first word and the second word to the facet tree in response to the user request. Embodiments of the invention that include these features may allow users to control facet tree updating while providing suggestions of facet tree entries that might have been overlooked.

The operations may include generating an annotator based on the facet tree, the annotator being a software process that adds annotations to words in an input document according to the hierarchical relationships defined by the facet tree.

The operations may include assigning each of the one or more documents to one or more of a plurality of subgroups according to a category or classification value of the document, the calculating may include calculating the degree of similarity in a subgroup of the plurality of subgroups based on similarity of usage of the first word and the second word in the subgroup, and the updating may include updating the facet tree based on the degree of similarity in the subgroup. Embodiments of the invention that include these features may allow the updating of the facet tree to take into account the different word usages in different contexts.

The operations may include generating an annotator based on the facet tree, the annotator being a software process that adds annotations to words in an input document according to the hierarchical relationships defined by the facet tree, the annotator including one or more branches defined by the plurality of subgroups. Embodiments of the invention that include these features may allow the generating of the annotator to take into account the different word usages in different contexts.

A second aspect of the innovations herein may include an apparatus including the above computer readable storage medium of the first aspect and a processor operable to execute the instructions.

A third aspect of the innovations herein may include a method including calculating a degree of similarity between a first word and a second word based on similarity of usage of the first word and the second word in one or more documents, and updating a facet tree based on the degree of similarity, the facet tree being a tree data structure that defines hierarchical relationships between a plurality of words.

A fourth aspect of the innovations herein may include a computer readable storage medium having instructions embodied therewith, the instructions executable by a processor to cause the processor to perform operations including, for each of one or more candidate words in one or more documents, calculating a degree of correlation between a co-occurrence of two or more existing facet tree entries in a document and an occurrence of the candidate word in the document, the facet tree being a tree data structure that defines hierarchical relationships between a plurality of words, and updating the facet tree on the basis of the one or more degrees of correlation. Embodiments of the invention that include these features may support updating of facet trees based on words found in one or more documents.

The updating may include adding a candidate word of the one or more candidate words to the facet tree at a higher level than the two or more existing facet tree entries in response to the degree of correlation of the candidate word exceeding a correlation threshold. Embodiments of the invention that include these features may offer users fully automated facet tree updating for ease of use.

The operations may include outputting the one or more degrees of correlation in association with the one or more candidate words and the two or more existing facet tree entries and receiving a user request to add a candidate word of the one or more candidate words to the facet tree, and the updating may include adding the candidate word to the facet tree at a higher level than the two or more existing facet tree entries in response to the user request. Embodiments of the invention that include these features may allow users to control facet tree updating while providing suggestions of facet tree entries that might have been overlooked.

A fifth aspect of the innovations herein may include an apparatus including the above computer readable storage medium of the fourth aspect and a processor operable to execute the instructions.

A sixth aspect of the innovations herein may include a method including, for each of one or more candidate words in one or more documents, calculating a degree of correlation between a co-occurrence of two or more existing facet tree entries in a document and an occurrence of the candidate word in the document, the facet tree being a tree data structure that defines hierarchical relationships between a plurality of words, and updating the facet tree on the basis of the one or more degrees of correlation.

A seventh aspect of the innovations herein may include an apparatus including means for calculating a degree of similarity between a first word and a second word based on similarity of usage of the first word and the second word in one or more documents, and means for updating a facet tree based on the degree of similarity, the facet tree being a tree data structure that defines hierarchical relationships between a plurality of words.

The summary clause does not necessarily describe all of the features of the embodiments of the present invention. The present invention may also be a combination or sub-combination of the features described above, including a combination of features from two or more of the aspects described above. The above and other features and advantages of the present invention will become more apparent from the following description of the embodiments, taken in conjunction with the accompanying drawings.

BRIEF DESCRIPTION OF THE SEVERAL VIEWS OF THE DRAWINGS

The following detailed description, given by way of example and not intended to limit the invention solely thereto, will best be appreciated in conjunction with the accompanying drawings.

FIG. 3 shows an example portion of a facet tree that may be updated by the apparatus 100.

FIG. 12 shows an example display produced in association with the apparatus 100.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Hereinafter, example embodiments of the present invention will be described. The embodiments should not be construed as limiting the scope of the invention, which is defined by the claims. The combinations of features described in the embodiments are not necessarily essential to the invention.

Figure 1:
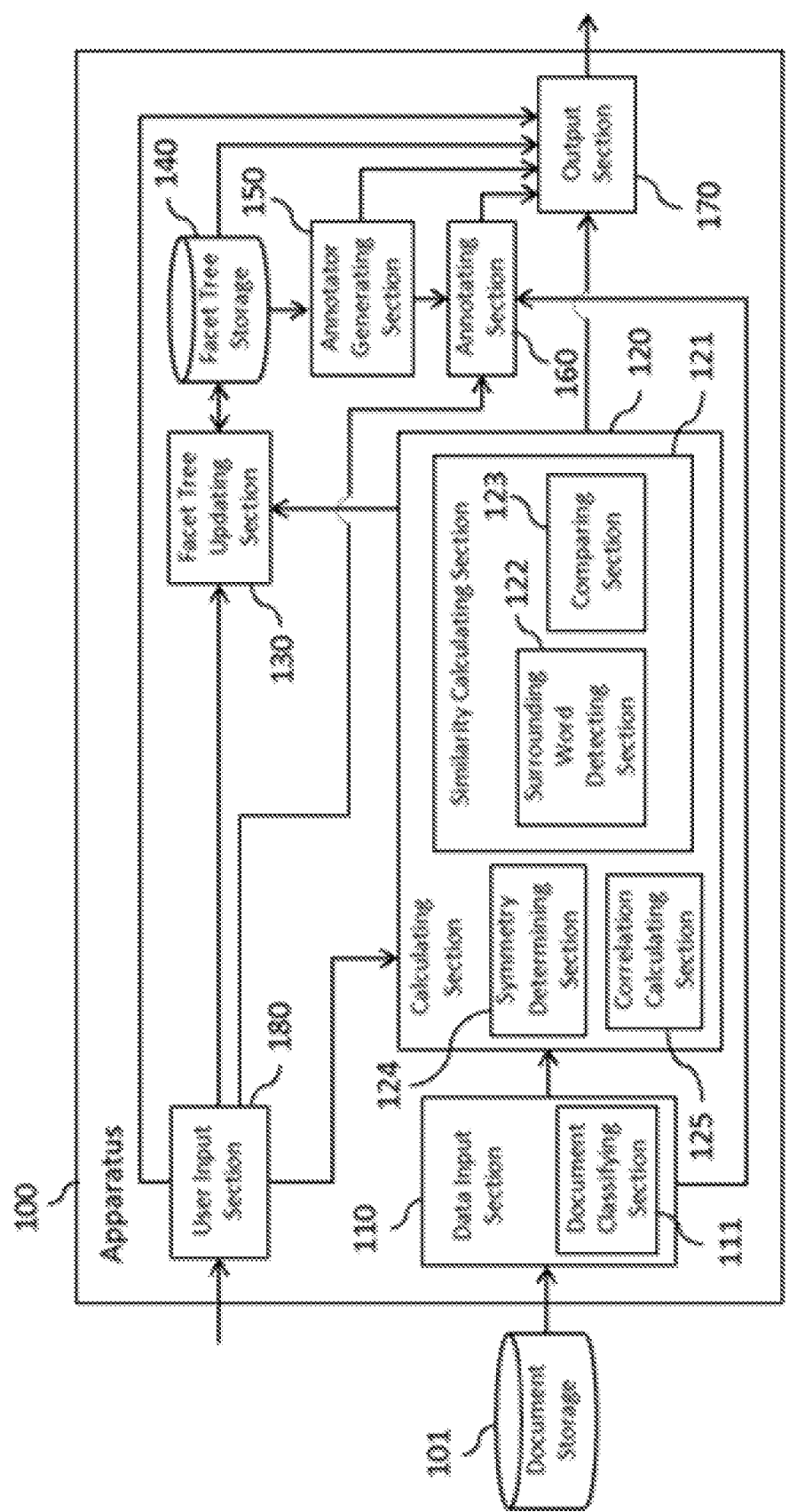
FIG. 1 shows an apparatus 100 according to an embodiment of the present invention.

FIG. 1 shows an apparatus 100 according to an embodiment of the present invention. The apparatus 100 updates a facet tree, which is a tree data structure that defines hierarchical relationships between a plurality of words. Updating the facet tree may include, for example, adding words and/or relationships between words to an existing facet tree. Updating the facet tree may also include creating the facet tree from scratch. Specifically, the apparatus 100 obtains one or more documents and dynamically updates the facet tree based on words found in the one or more documents. For example, the apparatus 100 may calculate a degree of similarity between a first word and a second word based on similarity of usage of the first word and the second word in the one or more documents, and update the facet tree based on the degree of similarity. As another example, the apparatus 100 may, for each of one or more candidate words in the one or more documents, calculate a degree of correlation between a co-occurrence of two or more existing facet tree entries in a document and an occurrence of the candidate word in the document, and update the facet tree on the basis of the one or more degrees of correlation. The output of the apparatus 100 can take the form of, for example, the facet tree, results of calculating a degree of similarity or a degree of correlation, a custom annotator generated based on the facet tree, an annotated input document, and/or statistical information about one or more input documents. On the basis of such output, document analysis can be performed more quickly and easily than by using conventional methods.

The apparatus 100 includes a data input section 110, a calculating section 120, a facet tree updating section 130, a facet tree storage 140, an annotator generating section 150, an annotating section 160, an output section 170, and a user input section 180.

The data input section 110 obtains one or more documents. A document may be any digital data containing text, for example, a file such as XML, PDF, HTML, LaTeX or any other file created by word processing software such as Microsoft Word, or a spreadsheet or presentation file created by spreadsheet software such as Microsoft Excel or presentation software such as PowerPoint. The meaning of document is not intended to be limited to a single file or any particular amount or unit of text, and in some cases a document may refer to a set of documents. In the example of the apparatus 100 shown in FIG. 1, the data input section 110 obtains the document(s) from an external document storage 101, but the document(s) may be stored and/or created within the apparatus 100 and/or can be obtained from or found on other computer(s) or server(s) through a network such as the Internet, WAN, and/or LAN. A document may include metadata indicating one or more categories or classification values of the document. The data input section 110 includes a document classifying section 111.

The document classifying section 111 assigns each of the one or more documents obtained by the data input section 110 to one or more of a plurality of subgroups according to a category or classification value of the document. Examples of categories and classification values include subject, genre, type, source, location, language, author demographic, audience demographic, publication date, and production date. Author and/or audience demographic may include nationality, ethnicity, age, gender, etc. If a document includes metadata indicating one or more categories or classification values of the document, the document classifying section 111 may assign the document to one or more subgroups according to the metadata. The document classifying section 111 may further be capable of independently determining one or more categories or classification values of a document, for example, by machine learning. The document classifying section 111 may determine that a document has a certain subject based on the prevalence of keywords associated with that subject in the document.

The calculating section 120 performs calculations based on words found in the one or more documents obtained by the data input section 110. As one example, the calculating section 120 may calculate a degree of similarity between a first word and a second word based on similarity of usage of the first word and the second word in the one or more documents. As another example, the calculating section 120 may, for each of one or more candidate words in the one or more documents, calculate a degree of correlation between a co-occurrence of two or more existing facet tree entries in a document and an occurrence of the candidate word in the document. The calculating section 120 includes a similarity calculating section 121, a symmetry determining section 124, and a correlation calculating section 125.

The similarity calculating section 121 calculates a degree of similarity between a first word and a second word based on similarity of usage of the first word and the second word in the one or more documents. The degree of similarity may be a number or other value indicative of how similar the first and second words are, within a range of possible values. Rather than a value within a range, the degree of similarity may be a binary true/false indicator, i.e. "similar" or "not similar." The first and second words may be any two words appearing in the one or more documents. The similarity calculating section 121 may, for example, calculate the degree of similarity between all word pairs or a selection of word pairs. The selection may be determined by a user. The selection may also be determined by the similarity calculating section 121 or calculating section 120 based on logic, an algorithm, and/or software implemented therein. For example, the similarity calculating section 121 or calculating section 120 may analyze the grammar of the one or more documents and select predetermined part(s) of speech (e.g. nouns, proper nouns, or nouns relating to some area such as nouns relating to the car industry). The similarity calculating section 121 includes a surrounding word detecting section 122 and a comparing section 123.

The surrounding word detecting section 122 detects one or more surrounding words appearing with the first word in the one or more documents. The surrounding word detecting section 122 may detect the one or more surrounding words anywhere in the same document as the first word. Alternatively, the surrounding word detecting section 122 may detect the one or more surrounding words within a proximity of the first word, with the proximity defined, for example, as a number of words, sentences, paragraphs, columns, pages, or document sections. For example, the surrounding word detecting section 122 may generate a feature vector of the first word whose elements correspond to other words, such that a value of 1 for a given element indicates that the corresponding word is a surrounding word of the first word. In the same way, the surrounding word detecting section 122 detects one or more surrounding words appearing with the second word in the one or more documents.

The comparing section 123 compares the one or more surrounding words of the first word with the one or more surrounding words of the second word. For example, the comparing section 123 may compare a feature vector generated by the surrounding word detecting section 122 for the first word with a feature vector generated by the surrounding word detecting section 122 for the second word. The similarity calculating section 121 calculates the degree of similarity based on the comparison by the comparing section 123. For example, the calculating section 121 may calculate the degree of similarity based on the number of identical surrounding words of the first word and the second word, i.e. the number of words that are surrounding words of both the first word and the second word. The calculating section 121 may calculate the degree of similarity based on an inner product of the feature vectors of the first word and the second word.

The symmetry determining section 124 determines a symmetry score between the first word and the second word based on additional degrees of similarity of the first word and the second word calculated by the similarity calculating section 121. For example, the similarity calculating section 121 may calculate, in addition to the degree of similarity between the first word and the second word, an additional degree of similarity between the first word and one or more other words and an additional degree of similarity between the second word and the one or more other words. The similarity determining section 124 may determine the symmetry score between the first word and the second word based on the difference between the number of additional degrees of similarity of the first word that exceed a similarity threshold and the number of additional degrees of similarity of the second word that exceed the similarity threshold. For example, in a case where the first word and the second word share many of the same surrounding words, resulting in a high or true degree of similarity, it may further be the case that the first word shares many surrounding words with other words as well. In this situation, there may be many words with which the first word has a high/true degree of similarity, while the second word only has a high/true degree of similarity with the first word. In such a case, there may be a positive difference between the number of additional degrees of similarity of the first word that exceed a similarity threshold and the number of additional degrees of similarity of the second word that exceed the similarity threshold, resulting in a symmetry score that indicates an asymmetry in which the first word can be said to have a more general usage than the second word. In the same way, a negative difference may result in a symmetry score that indicates an asymmetry in which the second word can be said to have a more general usage than the first word. If the difference is zero or between thresholds above and below zero, the symmetry score may indicate symmetry between the first and second words, with neither word having a more general usage than the other.

For each of one or more candidate words in the one or more documents, the correlation calculating section 125 calculates a degree of correlation between a co-occurrence of two or more existing facet tree entries in a document and an occurrence of the candidate word in the document. The degree of correlation may be a number or other value indicative of how correlated the candidate word is with the co-occurrence of the two or more existing facet tree entries, within a range of possible values. The one or more candidate words may be any word(s) appearing in the one or more documents. The correlation calculating section 125 may, for example, calculate the degree of correlation with respect to all words or a selection of words. The selection may be determined by a user. The selection may also be determined by the correlation calculating section 125 or calculating section 120 based on logic, an algorithm, and/or software implemented therein. For example, the correlation calculating section 125 or calculating section 120 may analyze the grammar of the one or more documents and select predetermined part(s) of speech (e.g. nouns, proper nouns, or nouns relating to some area such as nouns relating to the car industry). The two or more existing facet tree entries may be any entries already in the facet tree. The correlation calculating section 125 may, for example, calculate the degree of correlation with respect to two or more facet tree entries selected by a user. For each document in which the two or more existing facet tree entries co-occur, the correlation calculating section 125 may increase the degree of correlation if the candidate word also occurs in the document. The correlation calculating section 125 may calculate the degree of correlation for a candidate word based on a proximity of the candidate word in a document relative to the two or more existing facet tree entries, with the proximity defined, for example, as a number of words, sentences, paragraphs, columns, pages, or document sections. In this case, for each document in which the two or more existing facet tree entries co-occur, the correlation calculating section 125 may determine whether to increase the degree of correlation for the candidate word, or by how much, depending on the proximity of the candidate word in the document relative to the two or more existing facet tree entries.

The facet tree updating section 130 updates the facet tree based on the calculations performed by the calculating section 120. In the example in which the calculating section 120 calculates a degree of similarity between a first word and a second word based on similarity of usage of the first word and the second word in the one or more documents, the facet tree updating section 130 may update the facet tree based on the degree of similarity calculated by the calculating section 120. If the symmetry determining section 124 has determined a symmetry score between the first word and the second word, the facet tree updating section 130 may further update the facet tree based on the symmetry score. In the example in which, for each of one or more candidate words in the one or more documents, the calculating section 120 calculates a degree of correlation between a co-occurrence of two or more existing facet tree entries in a document and an occurrence of the candidate word in the document, the facet tree updating section 130 may update the facet tree based on the one or more degrees of correlation calculated by the calculating section 120.

The facet tree storage 140 stores the facet tree that is updated by the facet tree updating section 130. The facet tree stored in the facet tree storage 140 may be created from scratch by the facet tree updating section 130 or may be initially provided by a user of the apparatus 100 to thereafter be updated by the facet tree updating section 130.

The annotator generating section 150 generates an annotator based on the facet tree stored in the facet tree storage 140. The annotator is a software process that adds annotations to words in an input document according to the hierarchical relationships defined by the facet tree. For example, the facet tree may define a hierarchical parent-child relationship between the words "President" and "Lincoln" that indicates that the word "President" (e.g. "the President") is used to refer to President Lincoln, at least in certain documents. On the basis of this relationship in the facet tree, the annotator generating section 150 may generate an annotator that adds the annotation "Lincoln" to every occurrence of the word "President" in an input document. As another example, the facet tree may define a hierarchical parent-child relationship between the words "President" and "Lincoln" that indicates that "Lincoln" is an example of a "President." On the basis of this relationship in the facet tree, the annotator generating section 150 may generate an annotator that adds the annotation "President" to every occurrence of the word "Lincoln" in an input document.

The annotating section 160 adds annotations to words in one or more input documents using the annotator generated by the annotator generating section 150, thereby producing one or more annotated documents. The annotating section 160 may add the annotations by adding metadata to the one or more input documents.

The output section 170 outputs one or more of the various outputs of the apparatus 100 for use by a downstream device or user or as an intermediate step in a process performed by the apparatus 100. For example, the outputs may be stored, uploaded to a server, printed, or otherwise made available for viewing or analysis, or may be displayed on a screen in relation to a user query as an intermediate step in a process performed by the apparatus 100. The various outputs of the apparatus 100 output by the output section 170 may include, for example, the facet tree stored in the facet tree storage 140, the degrees of similarity, degrees of correlation, and/or symmetry scores calculated by the calculating section 120 in association with the words and facet tree entries for which they are calculated, the annotator generated by the annotator generating section 150 based on the facet tree stored in the facet tree storage 140, an annotated document produced by the annotating section 160, and/or statistical information about one or more input documents. For example, the output section 170 may produce statistical information about one or more input documents by counting words of interest in the annotated documents produced by the annotating section 160 from the one or more input documents. The output section 170 may refer to the annotations in place of or in addition to the original text when counting words of interest. The words of interest and specific statistical information to be produced can be determined, for example, by a user of the apparatus 100.

The output section 170 may output any of the various outputs through any output device or combination of output devices. For example, the output section 170 may be configured to provide still or moving visual output, audio output, or vibration or other touch-based output via a screen, speaker, printer, or other output device. The output section 170 may provide the various outputs to a remote user terminal or a remote user device.

The user input section 180 receives various inputs from a user of the apparatus 100. For example, the user input section 180 may receive, from a user, a selection input used by the calculating section 120, such as a selection of word pairs for which the calculating section 120 calculates the degree of similarity or a selection of candidate words and/or existing facet tree entries for which the calculating section 120 calculates the degree of correlation. The user input section 180 may also receive, from a user, a request to update the facet tree, for example, a request or selection in response to a query or other display produced by the output section 170. The user input section 180 may also receive, from a user, various selections and requests used by the annotating section 160 when annotating an input document or used by the output section 170 when producing output such as statistical information.

The user input section 180 may receive any of the various inputs through any input device or combination of input devices. For example, the user input section 180 may be configured to receive mouse input, keyboard input, touchscreen input, eye tracking input, voice commands, and/or gestures. The user input section 180 may receive the various inputs from a remote user terminal or a remote user device.

In the example of the apparatus 100 shown in FIG. 1, the calculating section 120 does not refer directly to the output of the facet tree storage 140 because the selection of existing facet tree entries for which the calculating section 120 calculates the degree of correlation is made by a user via the user input section 180. However, in a case where the calculating section 120 selects the existing facet tree entries without input by a user, the calculating section 120 may refer to the output of the facet tree storage 140 directly.

Figure 2:
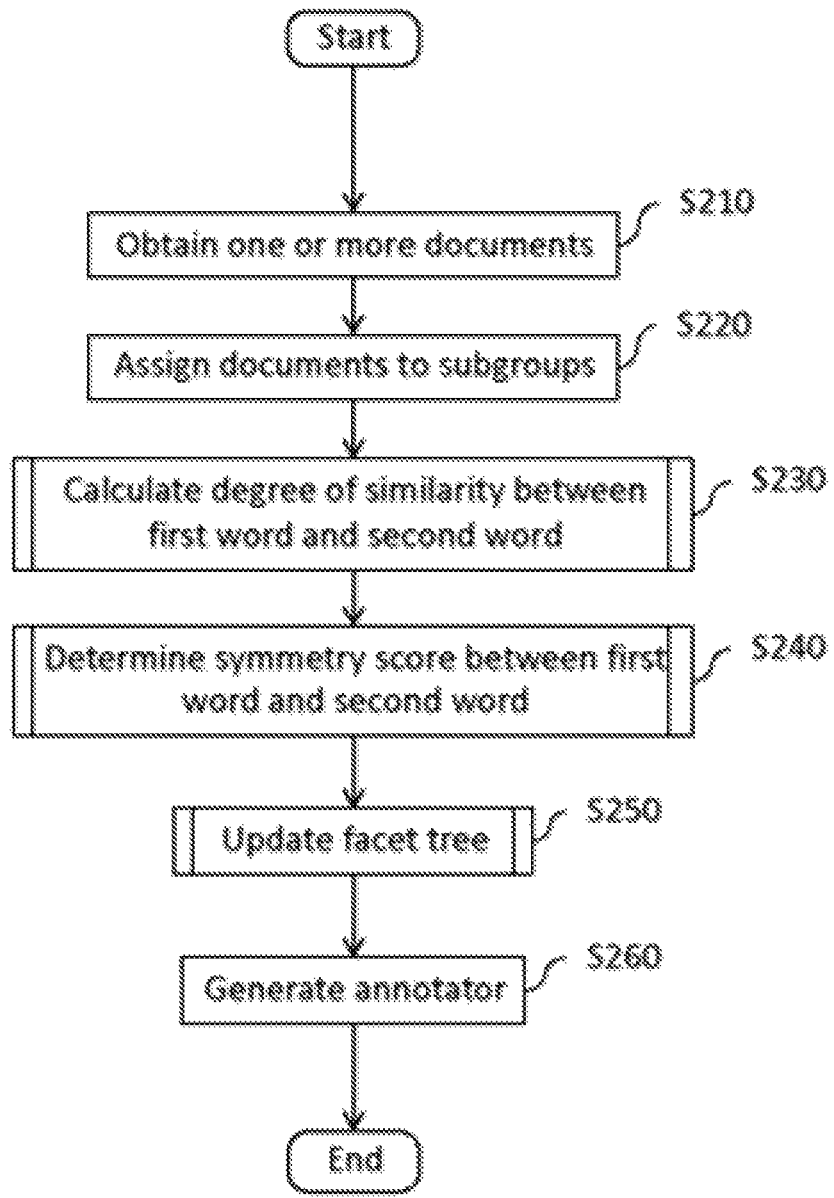
FIG. 2 shows an example operational flow of the apparatus 100 according to an embodiment of the present invention.

FIG. 2 shows an example operational flow of the apparatus 100 according to an embodiment of the present invention. In the example shown in FIG. 2, the apparatus 100 performs the operations from S210 to S260, but the apparatus 100 shown in FIG. 1 is not limited to using this operational flow. Also, the operational flow in FIG. 2 may be performed by a modified apparatus or a different apparatus that differs from the apparatus 100 shown in FIG. 1.

First, the apparatus 100 obtains one or more documents (S210). For example, the data input section 110 of the apparatus 100 may obtain one or more documents from the document storage 101.

Next, the apparatus 100 assigns the one or more documents to subgroups (S220). For example, the document classifying section 111 of the apparatus 100 may assign each of the one or more documents to one or more of a plurality of subgroups according to a category or classification value of the document. As a specific example, the document classifying section 111 may assign documents to subgroups including a subgroup defined by the subject "U.S. Civil War," a subgroup defined by the subject "U.S. Founding," and a plurality of publication date subgroups defined by publication year. Note that a single document may belong to more than one subgroup, such as a document published in 1861 that belongs to both "Publication Date: 1861" and "Subject: U.S. Civil War."

Next, the apparatus 100 calculates a degree of similarity between a first word and a second word in the one or more documents (S230). For example, the similarity calculating section 121 of the calculating section 120 of the apparatus 100 may calculate the degree of similarity in a subgroup of the plurality of subgroups based on similarity of usage of the first word and the second word in the subgroup. In the specific example of subgroups presented above, the similarity calculating section 121 may, for example, separately calculate the degree of similarity between two words in the subgroup "Subject: U.S. Civil War" and the degree of similarity between the two words in the subgroup "Subject: U.S. Founding," based on the similarity of usage of the two words in each subgroup.

Next, the apparatus 100 determines a symmetry score between the first word and the second word. For example, the symmetry determining section 124 of the apparatus 100 may determine a symmetry score that indicates symmetry between the words or indicates an asymmetry in which one word has a more general usage than the other, based on additional degrees of similarity calculated by the similarity calculating section 121.

Next, the apparatus 100 updates the facet tree (S250). For example, in a case were the degree of similarity has been calculated in a subgroup, the facet tree updating section 130 may update the facet tree based on the degree of similarity in the subgroup. The facet tree updating section 130 may update the facet tree to add a relationship between the first word and the second word that is defined in the facet tree as being applicable only to documents in the subgroup. To continue with the above specific example, in which separate degrees of similarity have been calculated for the two words in the subgroup "Subject U.S. Civil War" and "Subject: U.S. Founding," if the degree of similarity for the two words in the subgroup "Subject: U.S. Civil War" is high or true while the degree of similarity for the same two words in the subgroup "Subject: U.S. Founding" is low or false, the facet tree updating section 130 may update the facet tree to add a relationship between the first word and the second word that is defined in the facet tree as being applicable only to documents in the subgroup "Subject: U.S. Civil War."

The facet tree updating section 130 may further update the facet tree on the basis of the symmetry score determined by the symmetry determining section 124. For example, the facet tree updating section 130 may decide whether the added relationship between the two words is a sibling relationship or a parent/child relationship (and which word is the parent) on the basis of the symmetry score.

Lastly, the apparatus 100 generates an annotator (S260). For example, the annotator generating section 150 of the apparatus 100 may generate an annotator based on the facet tree stored in the facet tree storage 140. In a case where one or more degrees of similarity have been calculated in subgroups and the facet tree includes one or more relationships between words that are defined in the facet tree as being applicable only to specific subgroups, the annotator generating section 150 may generate an annotator that adds annotations to words in an input document according to which subgroup(s) the input document belongs to. For example, the annotator may include one or more branches defined by the plurality of subgroups. To continue with the above specific example, it may be the case that the words "President" and "Lincoln" have a high or true degree of similarity in the subgroup "Subject: U.S. Civil War" and a low or false degree of similarity in other subgroups. Accordingly, the facet tree may include a relationship between "President" and "Lincoln" that is defined in the facet tree as being applicable only to documents in the subgroup "Subject: U.S. Civil War." For example, the facet tree may define a hierarchical parent-child relationship between the words "President" and Lincoln" that indicates that the word "President" is used to refer to President Lincoln in documents in the subgroup "Subject: U.S. Civil War." In this situation, the annotator generating section 150 may generate an annotator that adds the annotation "Lincoln" to every occurrence of the word "President" if the input document belongs to the subgroup "Subject: U.S. Civil War."

FIG. 3 shows an example portion of a facet tree that may be updated by the apparatus 100. The facet tree shown in FIG. 3 may be stored, for example, in the facet tree storage 140 and updated by the facet tree updating section 130. With higher levels omitted (indicated as "<Root>"), the example portion shows the word "President" in a hierarchical parent-child relationship with four other facet tree entries, the relative hierarchical levels indicated by the number of dots "." preceding each entry. In this example, the facet tree defines a parent-child relationship between the words "President" and "Lincoln" that indicates that the word "President" should be annotated with "Lincoln" in documents in the subgroup "Subject: U.S. Civil War." The facet tree further defines a similar parent-child relationship between "President" and "Lincoln" that indicates that the word "President" should also be annotated with "Lincoln" in documents in the subgroup "Publication Date: 1861-1865"). Thus, an annotator generated by the annotator generating section 150 based on this facet tree might add an annotation of "Lincoln" to occurrences of "President" in documents whose subject is "U.S. Civil War" as well as any documents published between 1861 and 1865 irrespective of their subject. Meanwhile, the facet tree further defines two additional parent-child relationships between "President" and "Washington" that indicate that the word "President" should be annotated with "Washington" in documents in the subgroup "Subject: U.S. Founding" or in the subgroup "Publication Date: 1789-1797."

Figure 4:
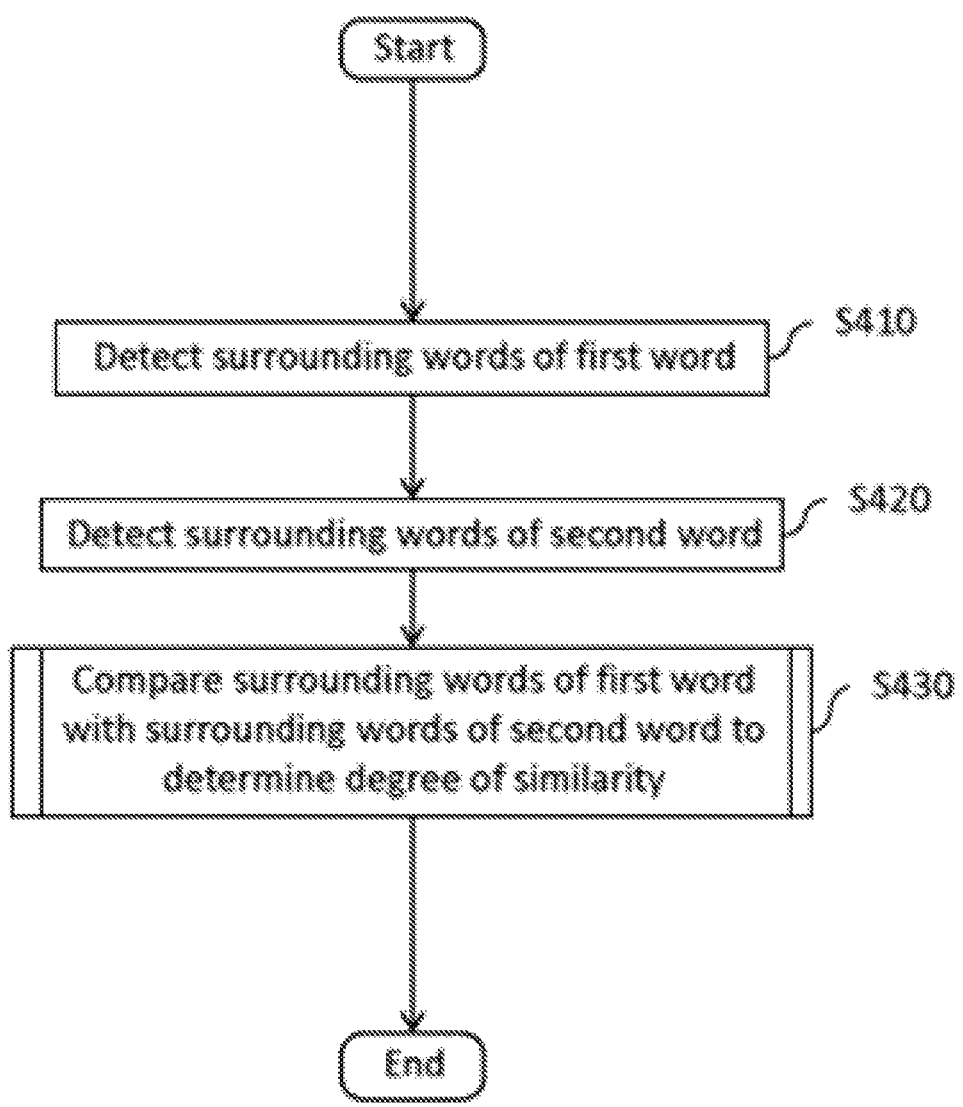
FIG. 4 shows an example operational flow of step S230 in FIG. 2.

FIG. 4 shows an example operational flow of step S230 in FIG. 2. With the one or more documents having been assigned to subgroups, the apparatus 100 detects surrounding words of a first word (S410) and second word (S420), which may be any two words appearing in the one or more documents as described above. For example, the surrounding word detecting section 122 of the similarity calculating section 121 of the calculating section 120 of the apparatus 100 may separately detect, for each subgroup of documents, one or more surrounding words appearing with the first word. Continuing with the above specific example, the surrounding word detecting section 122 may detect surrounding words of "President" in documents belonging to the subgroup "Subject: U.S. Civil War" and may separately detect surrounding words of "President" in documents belonging to the subgroup "Subject: U.S. Founding." The surrounding word detecting section 122 may thus generate a plurality of feature vectors of "President," one for each subgroup. In the same way, the surrounding word detecting section 122 may generate a plurality of feature vectors of "Lincoln," one for each subgroup.

Surrounding words of "President" in documents belonging to the subgroup "Subject: U.S. Civil War" might include, for example, "habeas corpus" and "slavery." These surrounding words might also be surrounding words of "Lincoln" in documents belonging to the subgroup "Subject: U.S. Civil War." On the other hand, surrounding words of "President" in documents belonging to the subgroup "Subject: U.S. Founding" might include, for example, "whiskey rebellion" and "residence act." In contrast, surrounding words of "Lincoln" in documents belonging to the subgroup "Subject: U.S. Founding" would not relate to the presidency or the not-yet-living Abraham Lincoln and might instead relate to the earlier American Revolutionary War general Benjamin Lincoln.

After detecting the surrounding words, the apparatus 100 compares the surrounding words of the first word with the surrounding words of the second word to determine the degree of similarity (S430). For example, the comparing section 123 of the similarity calculating section 121 of the calculating section 120 of the apparatus 100 may separately compare the surrounding words of the first and second words for each subgroup. In the above specific example, the comparing section 123 may compare the surrounding words of "President" in documents belonging to the subgroup "Subject: U.S. Civil War" with the surrounding words of "Lincoln" in documents belonging to the subgroup "Subject: U.S. Civil War," and may separately compare the surrounding words of "President" in documents belonging to the subgroup "Subject: U.S. Founding" with the surrounding words of "Lincoln" in documents belonging to the subgroup "Subject: U.S. Founding." This can be done, for example, by comparing the values of the elements of the feature vectors of "President" and "Lincoln" generated for the subgroup "Subject: U.S. Civil War" and separately comparing the values of the elements of the feature vectors of "President" and "Lincoln" generated for the subgroup "Subject: U.S. Founding." The similarity calculating section 121 calculates degrees of similarity in each subgroup based on the comparisons by the comparing section 123.

Figure 5:
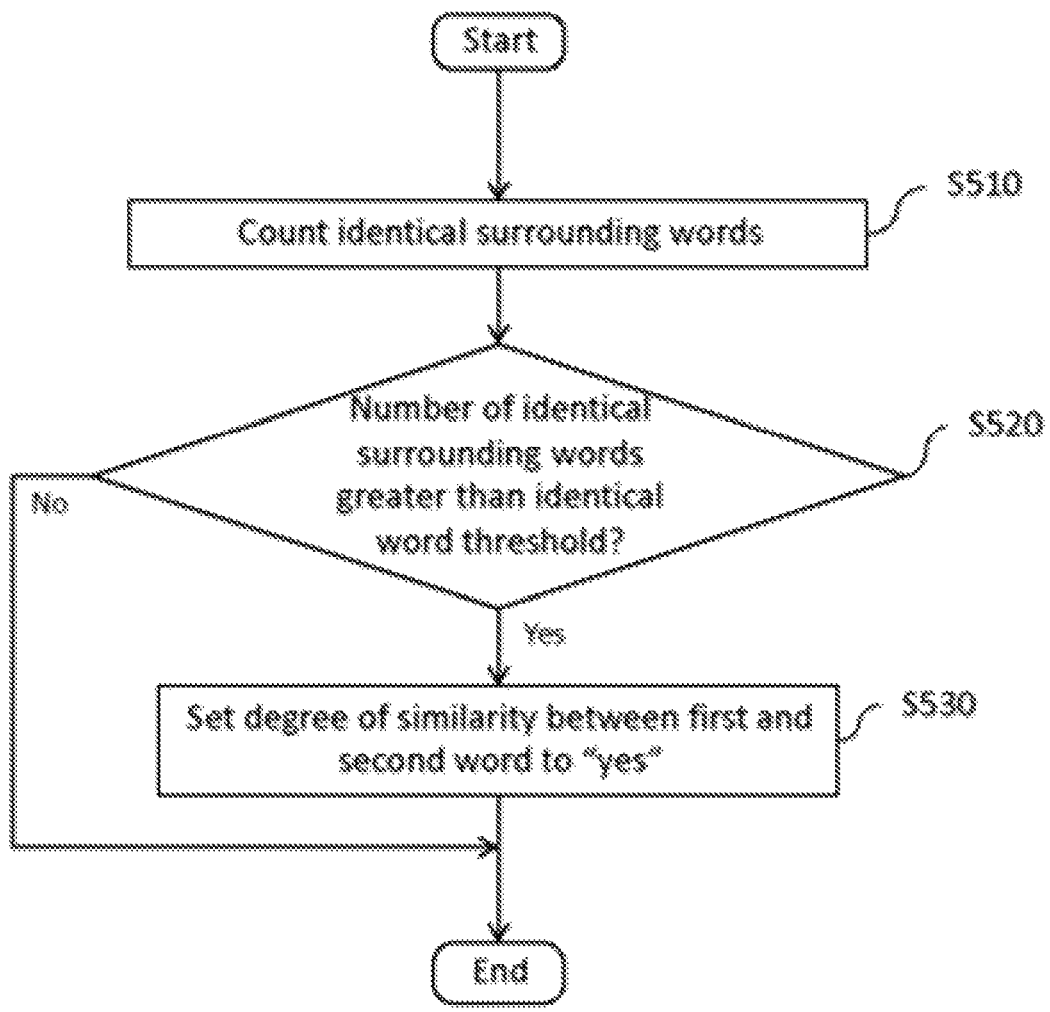
FIG. 5 shows an example operational flow of step S430 in FIG. 4.

FIG. 5 shows an example operational flow of step S430 in FIG. 4. First, the comparing section 123 counts the identical surrounding words of the first word and the second word (S510). The comparing section 123 may count the identical surrounding words separately for each subgroup. For example, if feature vectors have been generated for each word (or for each word and subgroup) as described above, and assuming that a value of 1 for a given element indicates that the corresponding word is a surrounding word while a value of 0 indicates that the corresponding word is not a surrounding word, the comparing section 123 may count the identical words of the first and second words by taking the dot product of their feature vectors.

If the number of identical words, e.g. the dot product, is greater than an identical word threshold ("Yes" at S520), the similarity calculating section 121 may set the degree of similarity between the first and second words (or between the first and second words for a given subgroup) to "yes" or true, indicating that the first and second words are similar (or similar for the given subgroup) (S530). If the number of identical words is not greater than the identical word threshold ("No" at S520), the similarity calculating section 121 may end the process of FIG. 5, leaving the degree of similarity unchanged or setting it to "no" or false, indicating that the words are not similar.

Figure 6:
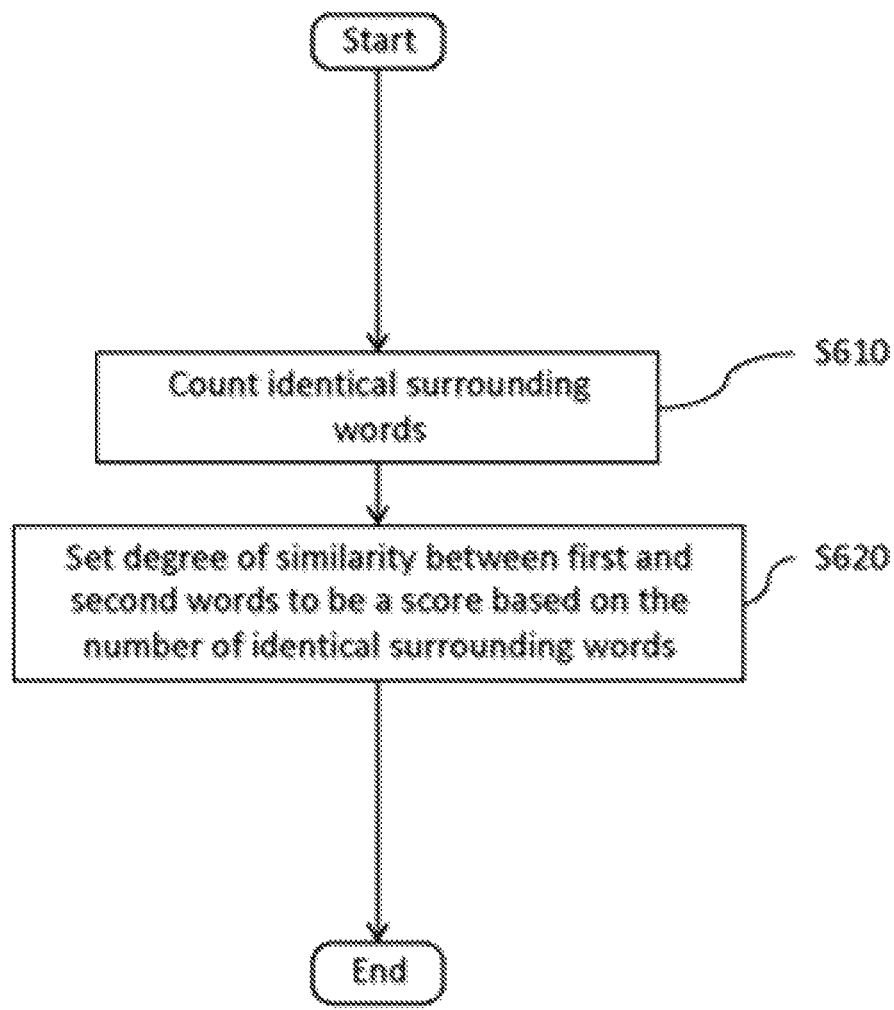
FIG. 6 shows an alternative example operational flow of step S430 in FIG. 4.

FIG. 6 shows an alternative example operational flow of step S430 in FIG. 4. First, just like in step S510, the comparing section 123 counts the identical surrounding words, e.g. calculates the dot product, of the first word and the second word (S610). However, instead of the thresholding approach of steps S520 and S530, the comparing section 123 sets the degree of similarity between the first and second words to be a score based on the number of identical surrounding words (S620). In this way, the degree of similarity may be a number or other value indicative of how similar the first and second words are, within a range of possible values, rather than a binary true/false indicator.

Figure 7:
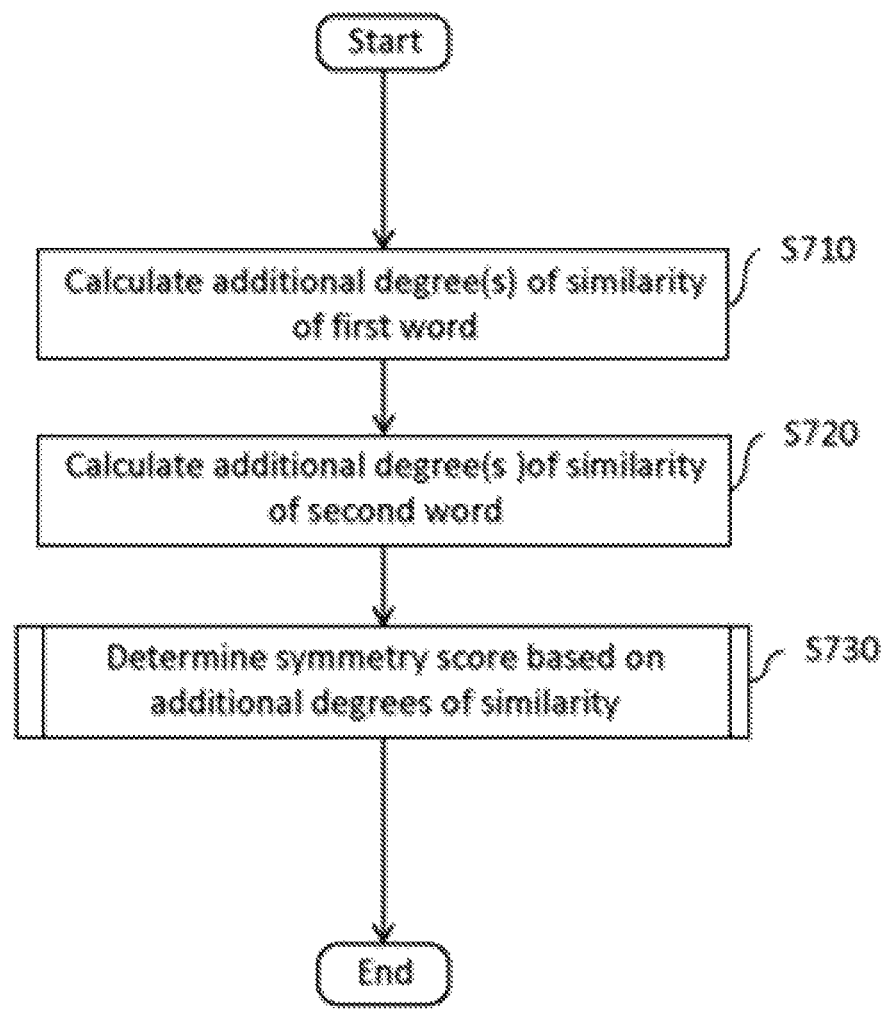
FIG. 7 shows an example operational flow of step S240 in FIG. 2.

FIG. 7 shows an example operational flow of step S240 in FIG. 2. First, the apparatus 100 calculates additional degrees of similarity of the first and second words. For example, in addition to calculating the degree of similarity between the first and second words in step S230 of FIG. 2, the similarity calculating section 121 may calculate one or more additional degrees of similarity between the first word and other words (S710). The similarity calculating section 121 may further calculate one or more additional degrees of similarity between the second word and the other words (S720). The similarity calculating section 121 may calculate the additional degrees of similarity in the same way as shown in the operational flow of FIG. 4. That is, to calculate an additional degree of similarity between the first word and another word, the similarity calculating section 121 may detect surrounding words of the first word (S410), detect surrounding words of the other word as in step S420, and compare the surrounding words of the first word with the surrounding words of the other word to determine the degree of similarity as in step S430 in accordance with the operational flow of FIG. 4 or FIG. 5. Note that it may be possible to reuse the result of step S410 and/or step S420 rather than re-performing these steps. Then, the symmetry determining section 124 determines the symmetry score based on the additional degrees of similarity (S730).

Figure 8:
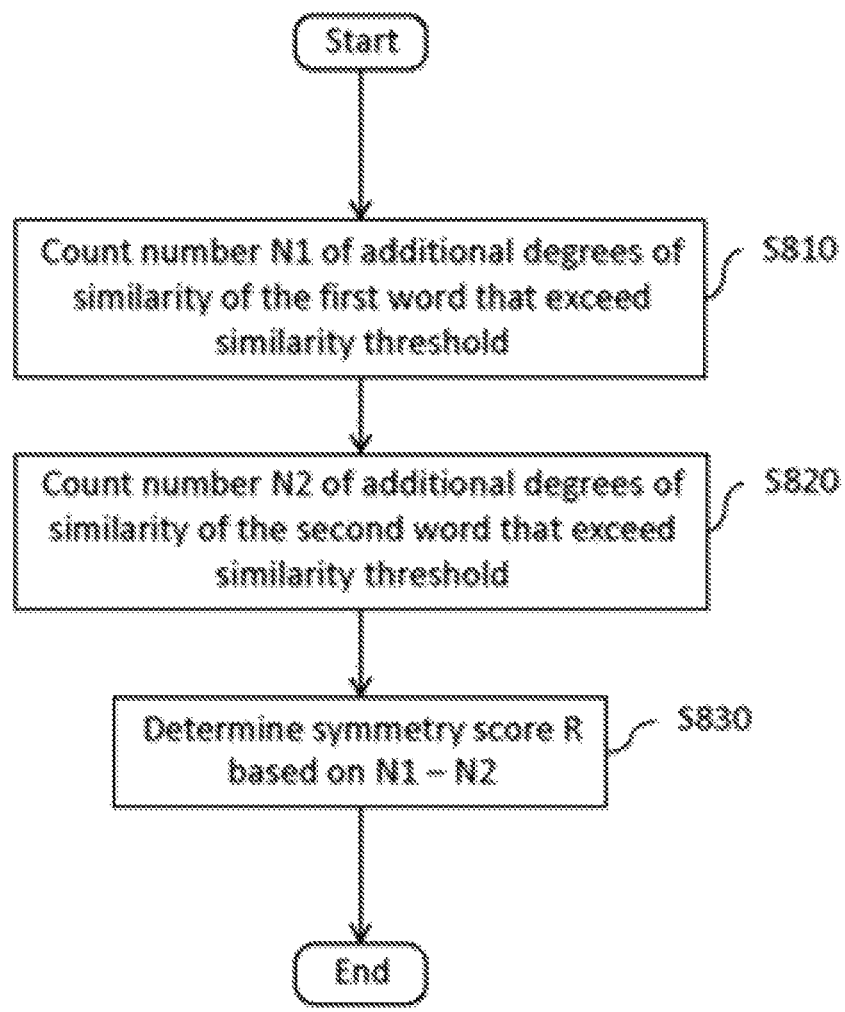
FIG. 8 shows an example operational flow of step S730 in FIG. 7.

FIG. 8 shows an example operational flow of step S730 in FIG. 7. With one or more additional degrees of similarity having been calculated for the first word and the second word, the symmetry determining section 124 counts the number of additional degrees of similarity of the first word that exceed a similarity threshold (S810) and counts the number of additional degrees of similarity of the second word that exceed a similarity threshold (S820). In the case where the degrees of similarity are true/false binary indicators as may be determined by the operational flow of FIG. 5, the "true" or "false" values may be given numerical values for purposes of comparing with the similarity threshold. With the number of additional degrees of similarity of the first word that exceed a similarity threshold denoted N1 and the number of additional degrees of similarity of the second word that exceed the similarity threshold denoted N2, the symmetry determining section 124 may determine a symmetry score R based on the difference N1−N2 (S830). For example, the symmetry score R may be equal to N1−N2 or otherwise derived from the difference N1−N2.

The number of additional degrees of similarity that exceed a similarity threshold (N1 or N2) may be a measure of the number of similar words. Thus, the symmetry score R may serve as an indicator of the difference between the number of similar words of the first word and the second word. Consequently, the symmetry score R contains information about whether the first and second words have the same or a similar number of similar words, and if not, which of the first and second words has a greater number of similar words.

Figure 9:
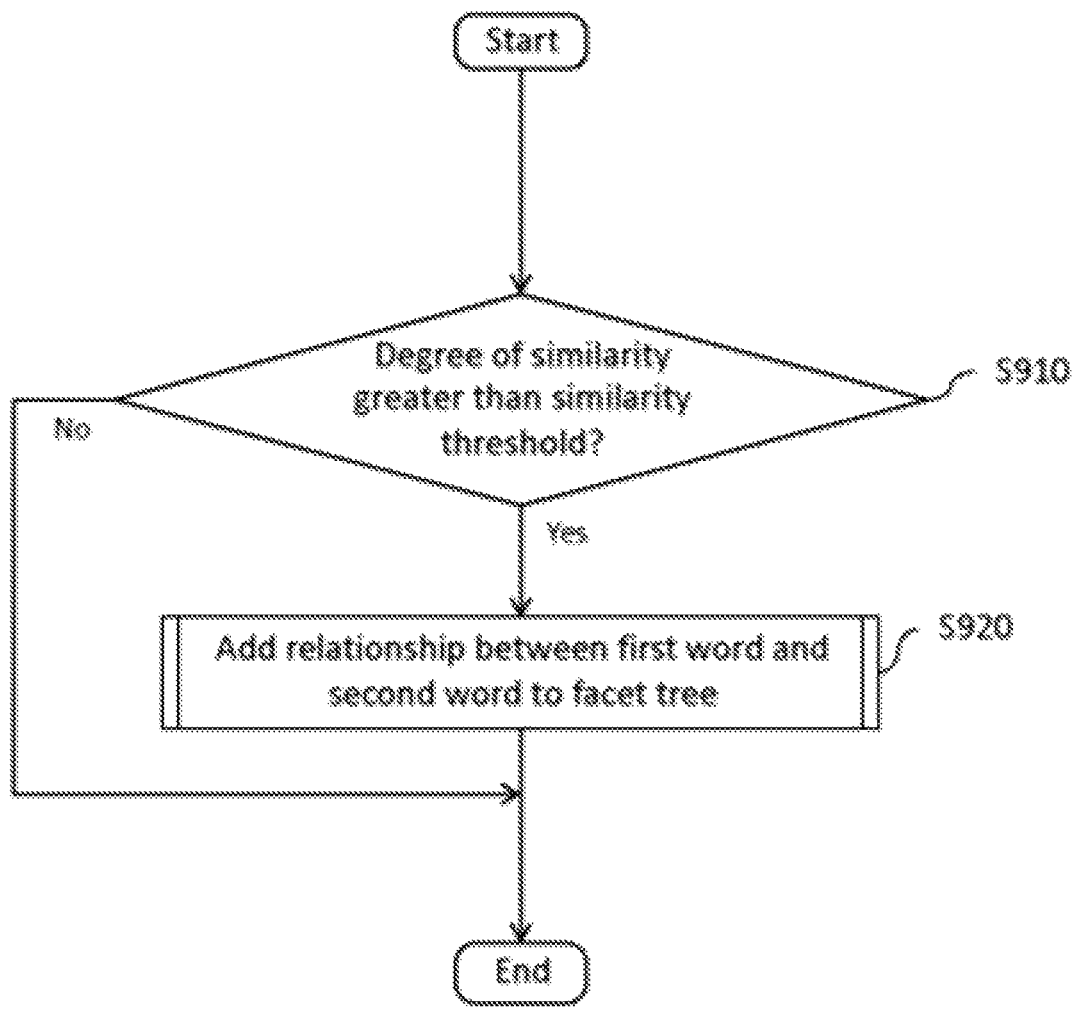
FIG. 9 shows an example operational flow of step S250 in FIG. 2.

FIG. 9 shows an example operational flow of step S250 in FIG. 2. With the degree(s) of similarity having been calculated, the apparatus 100 adds a relationship between the first word and the second word to the facet tree on the basis of the degree(s) of similarity. For example, referring to the operational flow of FIG. 7, if a calculated degree of similarity is greater than a similarity threshold ("Yes" at S910), the facet tree updating section 130 of the apparatus 100 may add a relationship between the first word and the second word to the facet tree stored in the facet tree storage 140 (S920). In the case where the degrees of similarity are true/false binary indicators as may be determined by the operational flow of FIG. 5, the "true" or "false" values may be given numerical values for purposes of comparing with the similarity threshold. In a case where the degree of similarity between the first word and the second word was calculated for a particular subgroup, the facet tree updating section 130 may add the relationship to the facet tree and define the relationship in the facet tree as being applicable only to documents in the subgroup.

The similarity threshold used by the facet tree updating section 130 in determining whether to add a relationship between the first word and the second word to the facet tree may be the same as or different from the similarity threshold used by the symmetry determining section 124 in determining the number of additional degrees of similarity that exceed a similarity threshold (N1 or N2).

Figure 10:
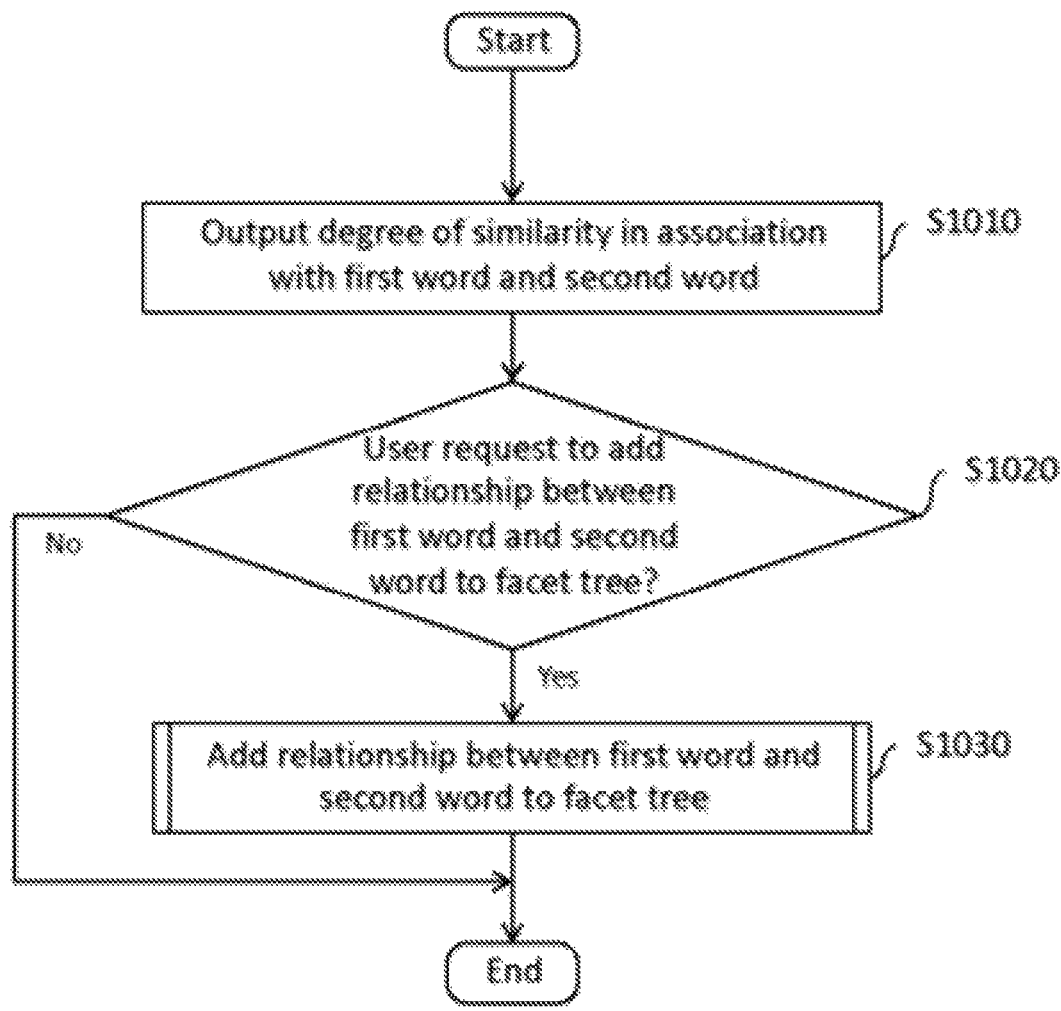
FIG. 10 shows an alternative example operational flow of step S250 in FIG. 2.

FIG. 10 shows an alternative example operational flow of step S250 in FIG. 2. Again, with the degree(s) of similarity having been calculated, the apparatus 100 adds a relationship between the first word and the second word to the facet tree on the basis of the degree(s) of similarity. However, in the case of the operational flow of FIG. 8, the relationship is added to the facet tree by user request. For example, the output section 170 may output the degree of similarity calculated by the calculating section 120 in association with the first word and the second word (S1010). If a plurality of degrees of similarity have been calculated in association with the first word and the second word (e.g. for different subgroups), the output section 170 may output the plurality of degrees of similarity. If degrees of similarity have been calculated in association with a plurality of word pairs (e.g. the first word and a third word, a fourth word and a fifth word, etc.), the output section 170 may output various degrees of similarity in association with various pairs of words (and for various subgroups). For example, the output section 170 may output a list of similar words (if the degree of similarity is a binary indication of "similar" or "not similar") or a list of high similarity words arranged by degree of similarity (if the degree of similarity is a value in a range of possible values). The output section 170 may display the degree(s) of similarity in association with the first word(s) and the second word(s) on a screen in relation to a user query. If one or more degrees of symmetry have been determined by the symmetry determining section 124, the output section 170 may further output the degree(s) of symmetry in association with the word pair(s).

Next, the apparatus 100 receives a user request to add a relationship between the first word and the second word to the facet tree ("Yes" at S1020). For example, the user input section 180 may receive the user request in the form of a mouse click or other selection from a plurality of words and degrees of similarity displayed on a screen by the output section 170. In response to the user request, the apparatus 100 adds a relationship between the first word and the second word to the facet tree (S1030). For example, the facet tree updating section 130 may add a relationship between the first word and the second word to the facet tree stored in the facet tree storage 140. In a case where the degree of similarity between the first word and the second word was calculated and output for a particular subgroup and the user request is to add a relationship only to documents in the subgroup, the facet tree updating section 130 may add the relationship to the facet tree and define the relationship in the facet tree as being applicable only to documents in the subgroup.

Figure 11:
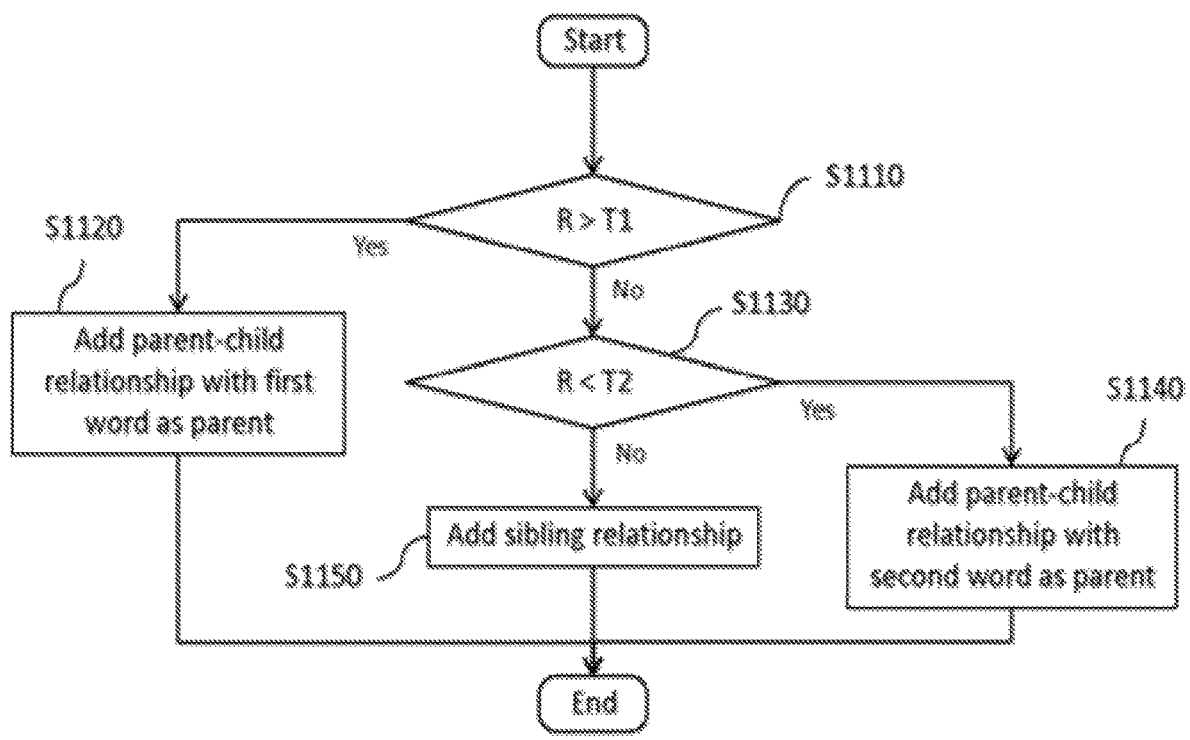
FIG. 11 shows an example operational flow of step S920 in FIG. 9 or step S1030 in FIG. 10.

FIG. 11 shows an example operational flow of step S920 in FIG. 9 or step S1030 in FIG. 10. On the basis of the symmetry score calculated for the first and second words, the apparatus 100 adds an appropriate hierarchical relationship between the first word and the second word to the facet tree. For example, the facet tree updating section 130 may add, as a relationship between the first word and the second word added to the facet tree based on the degree of similarity, a parent-child relationship with the first word as the parent (S1120) if the symmetry score R is above a first symmetry threshold T1 ("Yes" at S1110), a parent-child relationship with the second word as the parent (S1140) if the symmetry score R is below a second symmetry threshold T2 that is below the first symmetry threshold ("Yes" at S1130), and a sibling relationship (S1150) if the symmetry score R is neither above the first symmetry threshold T1 nor below the second symmetry threshold T2 ("No" at S1110 and S1130). If the symmetry score R is equal to the difference N1−N2, then a symmetry score R=0 may indicate that the first word and the second word have an equal number of similar words. In this case, the values for the symmetry thresholds T1 and T2 may be positive and negative, respectively, and set to define a window around R=0 within which the numbers of similar words are close enough to justify a sibling relationship between the first word and the second word in the facet tree. That is, the values for T1 and T2 may be set such that sibling relationships are typically or more often than not added for word pairs of the same level of generality, while parent-child relationships are typically or more often than not added for word pairs of different levels of generality. The values for T1 and T2 may, for example, be set by a user.

To continue with the above specific example, in which the comparing section 123 separately compares the surrounding words of "President" and "Lincoln" in two different subgroups, it may be found that "President" and "Lincoln" have high or true similarity in the subgroup "Subject: U.S. Civil War" and low or false similarity in the subgroup "Subject: U.S. Founding," as determined based on the number of identical surrounding words, for example, by the dot product of feature vectors. It may further be found that the number N1 of additional degrees of similarity of "President" that exceed a similarity threshold is significantly more than the number N2 of additional degrees of similarity of "Lincoln" that exceed a similarity threshold. For example, while "Lincoln" may have relatively few similar words, "President" may have many similar words, corresponding to other U.S. presidents besides Lincoln, e.g. Washington, presidents of other nations, presidents of businesses, etc. Therefore, the symmetry determining section 124 may determine a large positive symmetry score R between "President" and "Lincoln," indicating greater generality of "President." In this situation, the symmetry score R between "President" and "Lincoln" may exceed the first symmetry threshold T1, such that the facet tree updating section 130 adds a parent-child relationship to the facet tree with "President" as the parent and "Lincoln" as the child.

In the example of the operational flow shown in FIG. 11, the symmetry score is compared to symmetry thresholds T1 and T2 to determine what type of relationship (parent-child, sibling) to add to the facet tree after step S910 or step S1020 as part of the process of adding a relationship between the first word and the second word to the facet tree (S920 or S1030). However, the comparison of the symmetry score may instead be performed at an earlier time irrespective of whether the relationship between the first word and the second word is to be added to the facet tree. In the latter case, it is possible for the type of relationship between the first word and the second word to be represented in the output of the degree of similarity in step S1010 of FIG. 10 to be considered by the user, even if it is based on the comparison between the symmetry score R and the thresholds T1 and T2. In other cases, it may be possible to represent the type of relationship based on the symmetry score R in another way without conducting the comparison between the symmetry score R and the thresholds T1 and T2, or simply to display the symmetry score R.

FIG. 12 shows an example display produced in association with the apparatus 100. The display may be, for example, the result of the output section 170 displaying degrees of similarity in association with various word pairs on a screen in step S1010 of FIG. 10. Underneath the heading "High Similarity Words (max 1.0)" appear four calculated degrees of similarity. In this hypothetical example, the words "Lincoln" and "President" have a degree of similarity of 0.95 in the subgroup "Category: U.S. Civil War," the words "Yoshida" and "Prime Minister" have a degree of similarity of 0.89 in the subgroup "Category: Japan Politics," the words "USA" and "United States" have a degree of similarity of 0.80 over all documents considered (ignoring subgroups), and the words "Lincoln" and "President" have a degree of similarity of 0.75 in the subgroup "Date: 1861." In this example, it can be seen that the degrees of similarity are a value in a range (max 1.0) and so may have been calculated using the operational flow of FIG. 6.

Above the heading "High Similarity Words (max 1.0)" appear the words "Keyword Filter" followed by a prompt. A user may be invited to narrow or filter the list of high similarity words by inputting keywords or other search restrictions (e.g. document type) not shown. Such user input is an example of a selection input that can be received by the user input section 180.

In the example of FIG. 12, arrows are shown connecting each pair of words. The arrows indicate the type of relationship (parent-child, sibling) determined on the basis of the symmetry score R determined by the symmetry determining section 124 in step S830 of FIG. 8. As noted above, the type of relationship may be determined on the basis of an earlier comparison of the symmetry score R to symmetry thresholds T1 and T2, in order that it may be displayed to the user. In the first entry under "High Similarity Words (max 1.0)," the rightward facing arrow between "Lincoln" and "President" represents a parent-child relationship with "President" as the parent. That is, the relationship is unidirectional in the sense that "Lincoln" generally means "President" while "President" does not generally mean "Lincoln." Thus, if a user issues a request to add the listed relationship between "Lincoln" and "President" to the facet tree ("Yes" at S1020), the relationship will be added as a parent-child relationship as shown in FIG. 3 (" . . . President . . . Lincoln (Subject: U.S. Civil War)"). Similarly, if the user issues a request to add the relationship between "Lincoln" and "President" shown as the fourth entry in FIG. 12 ("Lincoln ☐ President (Date: 1861)"), the relationship will be added as a parent-child relationship as shown in FIG. 3 (" . . . President . . . Lincoln (Publication Date: 1861-1865)"). In this case, the date range indicated in the facet tree may be expanded to include the newly added relationship, e.g. from "Publication Date: 1862-1865" to "Publication Date: 1861-1865."

Meanwhile, in the third entry under "High Similarity Words (max 1.0)" in FIG. 12, the relationship between "USA" and "United States" is indicated with a double-arrow, representing a sibling relationship between "USA" and "United States." The relationship is bidirectional in the sense that "USA" and "United States" have been found to be interchangeable with neither term being more general than the other. Specifically, the degree of similarity of 0.80 may be considered a relatively high degree of similarity, indicating that "USA" and "United States" share many identical similar words, e.g. "nation" or "America." Meanwhile, the number of additional similar words of "USA" and the number of additional similar words of "United States" (or more specifically, the numbers of additional degrees of similarity that exceed a similarity threshold) may be the same or similar, resulting in a symmetry score R that is neither above the first symmetry threshold T1 nor below the second symmetry threshold T2. Thus, upon the selection of this entry by a user, the facet tree updating section 130 may add a sibling relationship to the facet tree between the words "USA" and "United States."

Figure 13:
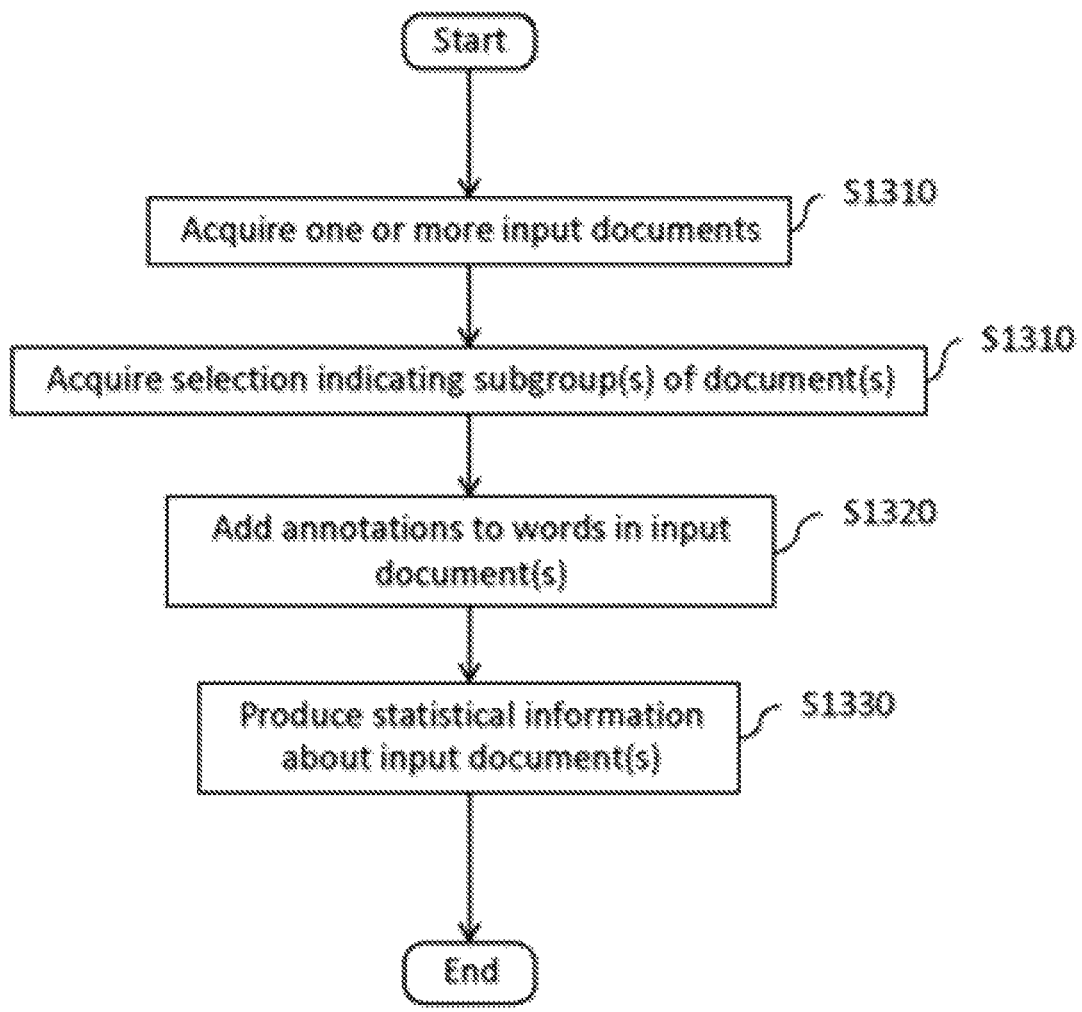
FIG. 13 shows an example operational flow of the apparatus 100 that may occur after the operational flow of FIG. 2.

FIG. 13 shows an example operational flow of the apparatus 100 that may occur after the operational flow of FIG. 2. After an annotator has been generated in step 260 of FIG. 2, the annotator may be applied by the apparatus 100 according to the operational flow of FIG. 13. First, the apparatus 100 acquires one or more input documents (S1310). For example, the annotating section 160 may acquire one or more input documents from among the documents obtained from the document storage 101 by the data input section 110. The one or more input documents may be a new set of documents relative to previously obtained documents.

Next, the apparatus 100 acquires a selection indicating a subgroup, of the plurality of subgroups, to which the one or more input documents belong (S1311). For example, if the document classifying section 111 of the input section 110 has assigned the one or more input documents to one or more of a plurality of subgroups, the annotating section 160 may acquire the selection indicating a subgroup from the input section 110. As another example, a user may input the selection indicating a subgroup to the apparatus 100 and the annotating section 160 may acquire the selection from the user input section 180.

Next, the apparatus 100 adds annotations to words in the one or more input documents (S1320). For example, the annotating section 160 may add annotations to words in the one or more input documents using the annotator generated by the annotator generating section 150 on the basis of the selection indicating a subgroup, thereby producing one or more annotated documents. To continue with the above specific example, the annotator generated by the annotator generating section 150 based on the facet tree stored in the facet tree storage 140 might add an annotation of "Lincoln" to occurrences of "President" in documents whose subject is "U.S. Civil War" as well as any documents published between 1861 and 1865 irrespective of their subject. In this case, upon acquiring one or more input documents and a selection indicating "Subject U.S. Civil War" or "Publication Date: 1861-1865," the annotating section 160 may apply the annotator to add the annotation "Lincoln" to occurrences of "President" in the one or more input documents. If a different selection is acquired, the annotating section 160 may apply the same annotator to add different annotations.

Lastly, the apparatus 100 produces statistical information about the one or more input documents (S1330). For example, the output section 170 may produce statistical information about the one or more input documents by counting words of interest in the annotated document(s). The output section 170 may obtain a selection of words of interest and/or specific statistical information requests from a user via the user input section 180.

Figure 14:
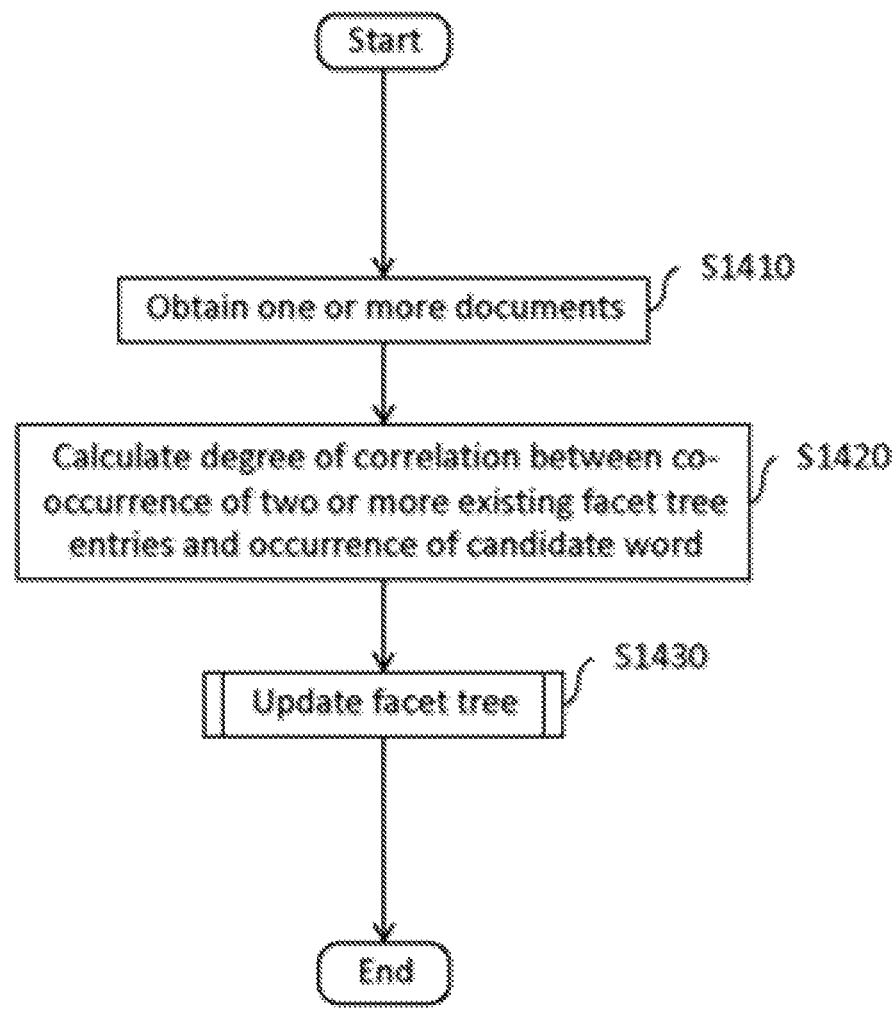
FIG. 14 shows another example operational flow of the apparatus 100 according to an embodiment of the present invention.

FIG. 14 shows another example operational flow of the apparatus 100 according to an embodiment of the present invention. In the example shown in FIG. 14, the apparatus 100 performs the operations from S1410 to S1430, but the apparatus 100 shown in FIG. 1 is not limited to using this operational flow. Also, the operational flow in FIG. 14 may be performed by a modified apparatus or a different apparatus that differs from the apparatus 100 shown in FIG. 1.

First, the apparatus 100 obtains one or more documents (S1410). For example, the data input section 110 of the apparatus 100 may obtain one or more documents from the document storage 101.

Next, the apparatus 100 calculates one or more degrees of correlation between a co-occurrence of two or more existing facet tree entries in a document and an occurrence of a candidate word in the document (S1420). For example, for each of one or more candidate words in the one or more documents, the correlation calculating section 125 of the calculating section 120 of the apparatus 100 may calculate a degree of correlation between a co-occurrence of two or more existing facet tree entries in a document and an occurrence of the candidate word in the document. Lastly, the apparatus 100 updates the facet tree on the basis of the one or more degrees of correlation (S1430).

Figure 15:
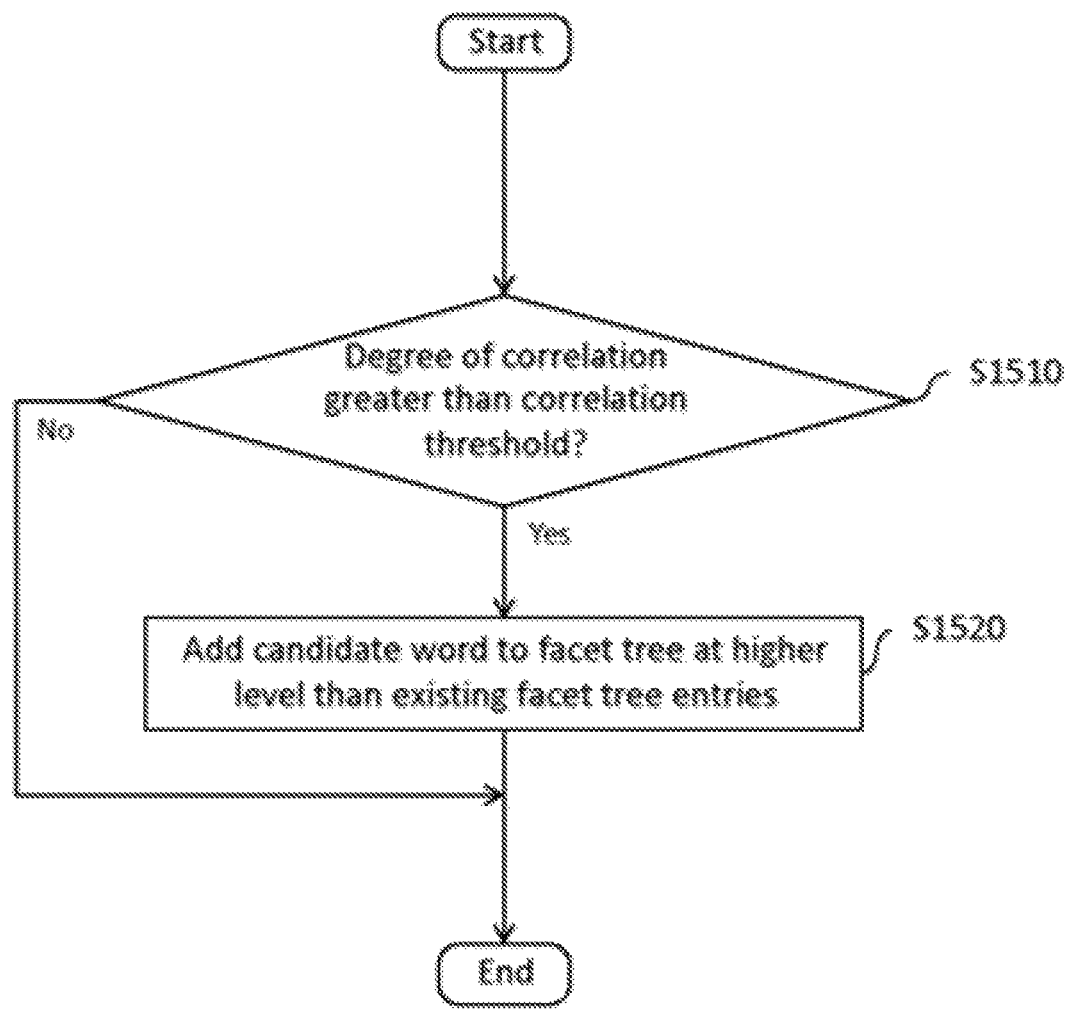
FIG. 15 shows an example operational flow of step S1430 in FIG. 14.

FIG. 15 shows an example operational flow of step S1430 in FIG. 14. With the degree(s) of correlation having been calculated, the apparatus 100 adds a candidate word to the facet tree on the basis of the degree(s) of correlation. For example, referring to the operational flow of FIG. 15, if the calculated degree of correlation of a candidate word is greater than a threshold ("Yes" at S710), the facet tree updating section 130 of the apparatus 100 may add the candidate word to the facet tree stored in the facet tree storage 140 at a higher level than the two or more existing facet tree entries.

Figure 16:
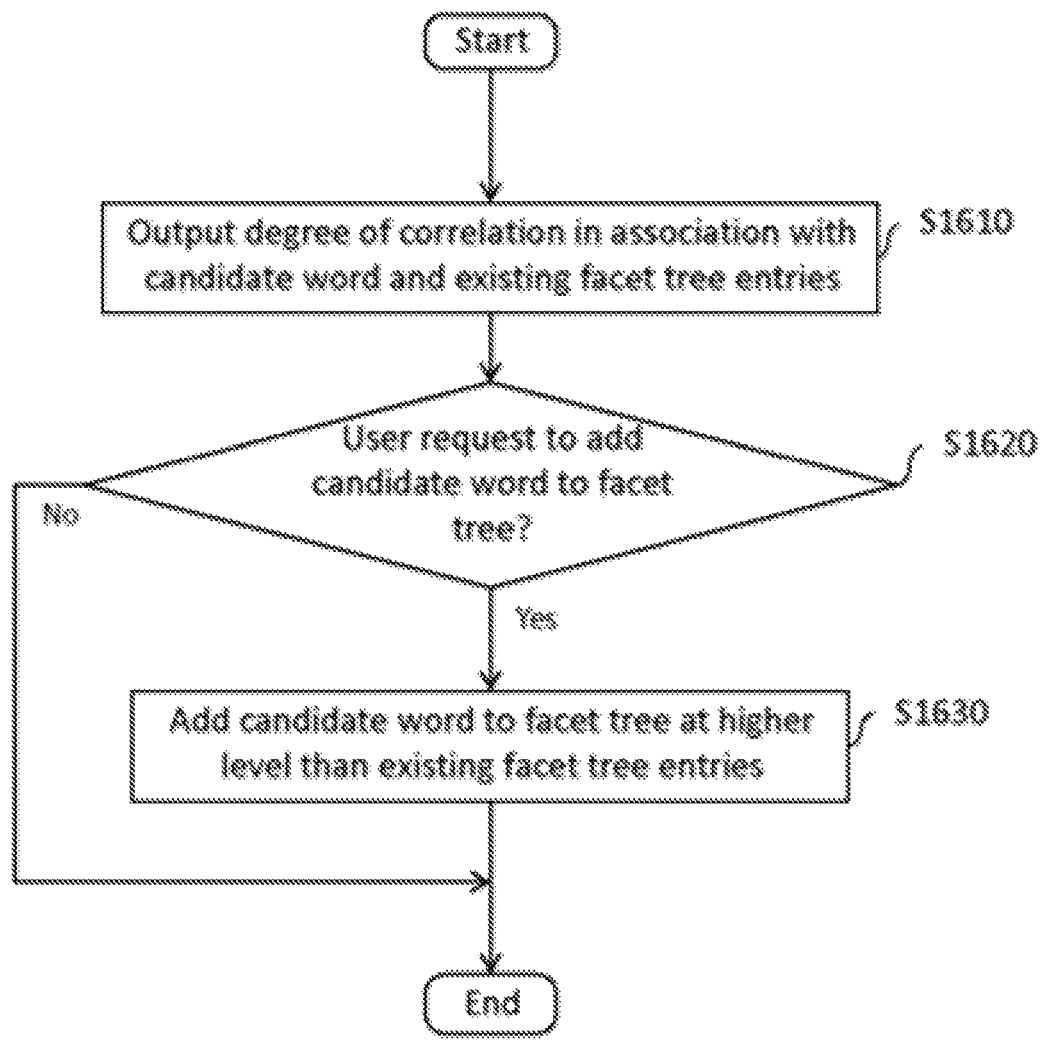
FIG. 16 shows an alternative example operational flow of step S1430 in FIG. 14.

FIG. 16 shows an alternative example operational flow of step S1430 in FIG. 14. Again, with the degree(s) of correlation having been calculated, the apparatus 100 adds a candidate word to the facet tree on the basis of the degree(s) of correlation. However, in the case of the operational flow of FIG. 16, the candidate word is added to the facet tree by user request. For example, the output section 170 may output the one or more degrees of correlation calculated by the calculating section 120 in association with the one or more candidate words and the two or more existing facet tree entries (S1610). If a plurality of degrees of correlation have been calculated in association with the two or more existing facet tree entries (e.g. for different candidate words), the output section 170 may output the plurality of degrees of correlation. For example, the output section 170 may output a list of highly correlated words arranged by degree of correlation. The output section 170 may display the degree(s) of correlation in association with the candidate words on a screen in relation to a user query.

Next, the apparatus 100 receives a user request to add a candidate word of the one or more candidate words to the facet tree ("Yes" at S1620). For example, the user input section 180 may receive the user request in the form of a mouse click or other selection from a plurality of words and degrees of correlation displayed on a screen by the output section 170. In response to the user request, the apparatus 100 adds a candidate word to the facet tree (S1630). For example, the facet tree updating section 130 may add the candidate word to the facet tree stored in the facet tree storage 140 at a higher level than the two or more existing facet tree entries.

Figure 17:
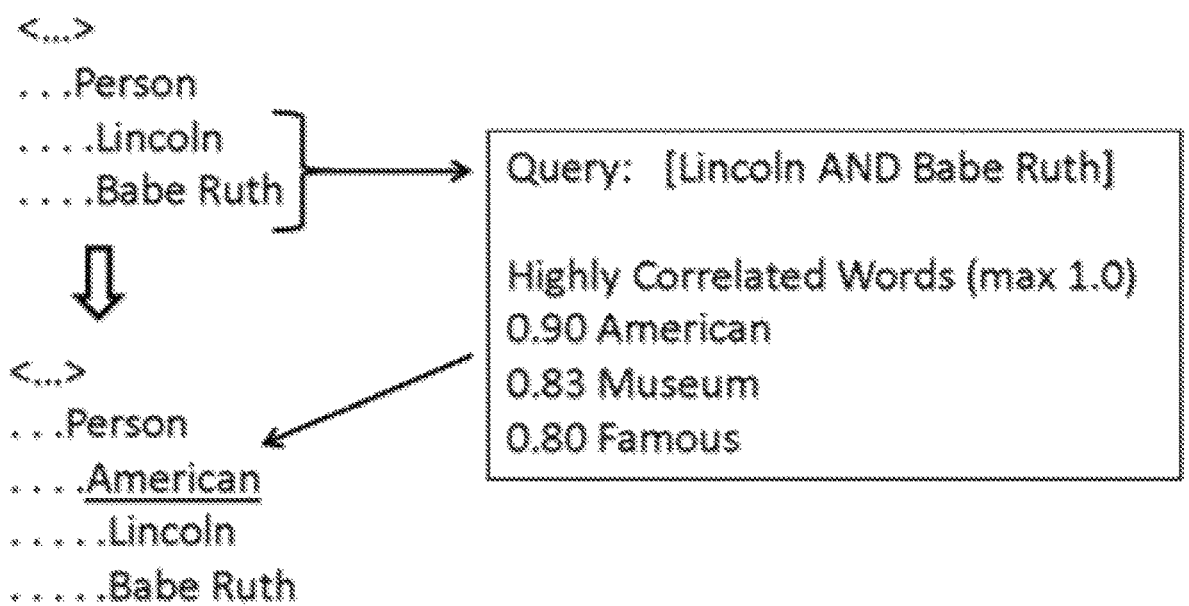
FIG. 17 shows an example portion of a facet tree being updated by the apparatus 100 along with an example display produced in association with the apparatus 100.

FIG. 17 shows an example portion of a facet tree being updated by the apparatus 100 along with an example display produced in association with the apparatus 100. The facet tree shown in FIG. 17 may be stored, for example, in the facet tree storage 140 and updated by the facet tree updating section 130. The display may be, for example, the result of the output section 170 displaying degrees of correlation in association with various candidate words on a screen in step S1610 of FIG. 16. The facet tree is shown in "before" and "after" stages as denoted by the downward-facing arrow. In the "before" stage (with higher levels omitted as indicated by "<Root>"), the example portion shows the word "Person" in a hierarchical parent-child relationship with "Lincoln" and "Babe Ruth." In this example, the facet tree defines a parent-child relationship between the words "President" and "Lincoln" that indicates that "Lincoln" is an example of a "Person." The facet tree further defines a similar parent-child relationship between "President" and "Babe Ruth" that indicates that "Babe Ruth" is an example of a "Person." The words "Lincoln" and "Babe Ruth" have a sibling relationship.

The top of the display indicates two existing facet tree entries, "Lincoln" and "Babe Ruth," on the basis of which the degrees of correlation have been calculated. In this example, "Lincoln" and "Babe Ruth" appear as a Boolean search query "Lincoln AND Babe Ruth." The user of the apparatus 100 may have selected these words from an output facet tree. Below, underneath the heading "Highly Correlated Words (max 1.0)" appear calculated degrees of correlation for three candidate words. In this hypothetical example, the candidate word "American" has a degree of correlation of 0.90, the candidate word "Museum" has a degree of correlation of 0.83, and the candidate word "Famous" has a degree of correlation of 0.80, each with respect to the co-occurrence of "Lincoln" and "Babe Ruth" in a given document. In this example, it can be seen that the degrees of correlation are values in a range whose maximum is 1.0. The degree of correlation may indicate the portion of documents within the query that also contain the candidate word. For example, the degree of correlation of 0.90 for "American" may indicate that 90% of the documents containing both "Lincoln" and "Babe Ruth" also contain "American." The degrees of correlation may further be influenced by the proximity of the candidate word in the documents with respect to the existing facet tree entries "Lincoln" and "Babe Ruth."

In the "after" stage of the facet tree (with higher levels again omitted as indicated by "<Root>"), the example portion shows that the candidate word "American" has been added at a higher level than the existing facet tree entries "Lincoln" and "Babe Ruth." Assuming the display in FIG. 17 is the result of the output section 170 displaying degrees of correlation in association with various candidate words on a screen in step S1610 of FIG. 16, the addition of "American" to the facet tree at a higher level than "Lincoln" and "Babe Ruth" may be the result of a user request to add the candidate word at step S1620 and the addition of the candidate word to the facet tree at step S1630. In the resulting facet tree, a parent-child relationship is defined between the words "American" and "Lincoln," indicating that Lincoln is an example of an "American," and a similar parent-child relationship is defined between the words "American" and "Babe Ruth," indicating that "Babe Ruth" is an example of an "American." The words "Lincoln" and "Babe Ruth" still have a sibling relationship.

As can be understood from this disclosure, given one or more documents, the features of the apparatus 100 can be used to dynamically update a facet tree based on words found in the one or more documents. Thus, document analysis can be performed quickly and easily.

Figure 18:
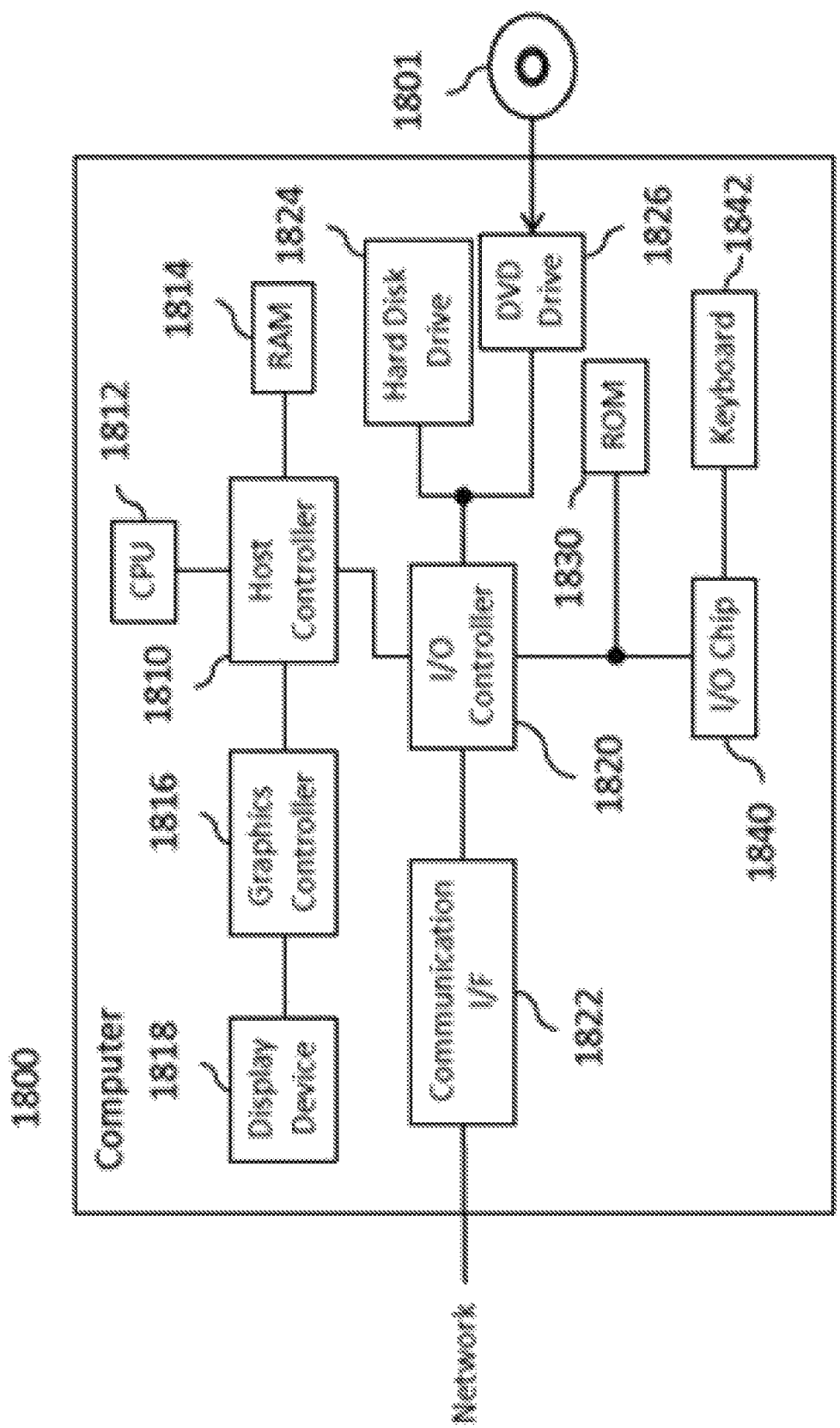
FIG. 18 shows an example of a computer 1800 in which the apparatus 100, the operational flows of FIGS. 2, 13, 14, and/or other embodiments of the claimed invention may be wholly or partly embodied.

FIG. 18 shows an example of a computer 1800 in which the apparatus 100, the operational flows of FIGS. 2, 13, 14, and/or other embodiments of the claimed invention may be wholly or partly embodied. The computer 1800 according to the present embodiment includes a CPU 1812, a RAM 1814, a graphics controller 1816, and a display device 1818, which are mutually connected by a host controller 1810. The computer 1800 also includes input/output units such as a communication interface 1822, a hard disk drive 1824, and a DVD-ROM drive 1826, which are connected to the host controller 1810 via an input/output controller 1820. The computer also includes legacy input/output units such as a ROM 1830 and a keyboard 1842, which is connected to the input/output controller 1820 through an input/output chip 1840.

The host controller 1810 connects the RAM 1814 with the CPU 1812 and the graphics controller 1816, which access the RAM 1814 at a high transfer rate. The CPU 1812 operates according to programs stored in the ROM 1830 and the RAM 1814, thereby controlling each unit. The graphics controller 1816 obtains image data generated by the CPU 1812 on a frame buffer or the like provided in the RAM 1814, and causes the image data to be displayed on the display device 1818. Alternatively, the graphics controller 1816 may contain therein a frame buffer or the like for storing image data generated by the CPU 1812.

The input/output controller 1820 connects the host controller 1810 with the communication interface 1822, the hard disk drive 1824, and the DVD-ROM drive 1826, which are relatively high-speed input/output units. The communication interface 1822 communicates with other electronic devices via a network. The hard disk drive 1824 stores programs and data used by the CPU 1812 within the computer 1800. The DVD-ROM drive 1826 reads the programs or the data from the DVD-ROM 1801, and provides the hard disk drive 1824 with the programs or the data via the RAM 1814.

The ROM 1830 and the keyboard 1842 and the input/output chip 1840, which are relatively low-speed input/output units, are connected to the input/output controller 1820. The ROM 1830 stores therein a boot program or the like executed by the computer 1800 at the time of activation, a program depending on the hardware of the computer 1800. The keyboard 1842 inputs text data or commands from a user, and may provide the hard disk drive 1824 with the text data or the commands via the RAM 1814. The input/output chip 1840 connects the keyboard 1842 to the input/output controller 1820, and may connect various input/output units via a parallel port, a serial port, a keyboard port, a mouse port, and the like to the input/output controller 1820.

A program to be stored on the hard disk drive 1824 via the RAM 1014 is provided by a recording medium such as the DVD-ROM 1801 or an IC card. The program is read from the recording medium, installed into the hard disk drive 1824 within the computer 1800 via the RAM 1814, and executed in the CPU 1812.

A program that is installed in the computer 1800 can cause the computer 1800 to function as an apparatus such as the apparatus 100 of FIG. 1. Such a program may act on the CPU 1812 to cause the computer 1800 to function as some or all of the sections, components, elements, databases, etc. of the apparatus 100 of FIG. 1 (e.g., the calculating section 120, the facet tree updating section 130, etc.).

A program that is installed in the computer 1800 can also cause the computer 1800 to perform an operational flow such as the operational flow of FIG. 2, 13, or 14. Such a program may act on the CPU 1812 to cause the computer

1800 to perform some or all of the steps of FIG. 2, 13, or 14 (e.g., calculate degree of similarity between first word and second word S230, update facet tree S250, etc.).

The information processing described in these programs is read into the computer 1800, resulting in the cooperation between a program and the above-mentioned various types of hardware resources. An apparatus or method may be constituted by realizing the operation or processing of information in accordance with the usage of the computer 1800.

For example, when communication is performed between the computer 1800 and an external device, the CPU 1812 may execute a communication program loaded onto the RAM 1814 to instruct communication processing to the communication interface 1822, based on the processing described in the communication program.

The communication interface 1822, under control of the CPU 1812, reads transmission data stored on a transmission buffering region provided in a recording medium such as the RAM 1814, the hard disk drive 1824, or the DVD-ROM 1801, and transmits the read transmission data to a network or writes reception data received from a network to a reception buffering region or the like provided on the recording medium. In this way, the communication interface 1822 may exchange transmission/reception data with a recording medium by a DMA (direct memory access) method or by a configuration in which the CPU 1812 reads the data from the recording medium or the communication interface 1822 of a transfer destination and writes the data into the communication interface 1822 or the recording medium of the transfer destination, so as to transfer the transmission/reception data.

In addition, the CPU 1812 may cause all or a necessary portion of a file or a database to be read into the RAM 1814 such as by DMA transfer, the file or the database having been stored in an external recording medium such as the hard disk drive 1824, the DVD-ROM drive 1826 (DVD-ROM 1801) and perform various types of processing on the data on the RAM 1814. The CPU 1812 may then write back the processed data to the external recording medium by means of a DMA transfer method or the like. In such processing, the RAM 1814 can be considered to temporarily store the contents of the external recording medium, and so the RAM 1814, the external recording apparatus, and the like are collectively referred to as a memory, a storage section, a recording medium, a computer readable medium, etc.

Various types of information, such as various types of programs, data, tables, and databases, may be stored in the recording apparatus to undergo information processing. Note that the CPU 1812 may also use a part of the RAM 1814 to perform reading/writing thereto on a cache memory. In such an embodiment, the cache is considered to be contained in the RAM 1814, the memory, and/or the recording medium unless noted otherwise, since the cache memory performs part of the function of the RAM 1814.

The CPU 1812 may perform various types of processing on the data read from the RAM 1814, which includes various types of operations, processing of information, condition judging, search/replace of information, etc., as described throughout this disclosure and designated by an instruction sequence of programs, and writes the result back to the RAM 1814. For example, when performing condition judging, the CPU 1812 may judge whether each type of variable is larger, smaller, no smaller than, no greater than, or equal to the other variable or constant, and when the condition judging results in the affirmative (or in the negative), the process branches to a different instruction sequence or calls a subroutine.

In addition, the CPU 1812 may search for information in a file, a database, etc., in the recording medium. For example, when a plurality of entries, each having an attribute value of a first attribute is associated with an attribute value of a second attribute, are stored in a recording apparatus, the CPU 1812 may search for an entry matching the condition whose attribute value of the first attribute is designated, from among the plurality of entries stored in the recording medium, and reads the attribute value of the second attribute stored in the entry, thereby obtaining the attribute value of the second attribute associated with the first attribute satisfying the predetermined condition.

The above-explained program or module may be stored in an external recording medium. Exemplary recording mediums include a DVD-ROM 1801, as well as an optical recording medium such as a Blu-ray Disk or a CD, a magneto-optic recording medium such as a MO, a tape medium, and a semiconductor memory such as an IC card. In addition, a recording medium such as a hard disk or a RAM provided in a server system connected to a dedicated communication network or the Internet can be used as a recording medium, thereby providing the program to the computer 1800 via the network.

The present invention may be a system, an apparatus, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, apparatus, method, and computer program product have been disclosed. However, numerous modifications and substitutions can be made without deviating from the scope of the present invention. Therefore, the present invention has been disclosed by way of example and not limitation.

What is claimed is:

1. A method for generating a facet tree, the method comprising:
   detecting one or more surrounding words appearing with a first word in one or more documents,
   detecting one or more surrounding words appearing with a second word in the one or more documents,
   comparing the one or more surrounding words of the first word with the one or more surrounding words of the second word,
   calculating the degree of similarity between the first word and the second word based on the comparing;
   generating a facet tree based on the degree of similarity between the first word and the second word, the facet tree being a tree data structure that defines hierarchical relationships between a plurality of words;
   generating an annotator based on the facet tree, the annotator being a software process that adds annotations to words in the one or more documents according to the hierarchical relationships defined in the facet tree; and
   adding annotations to words in the one or more documents using the annotator, thereby producing one or more annotated documents.

2. The method of claim 1, further comprising:
   calculating an additional degree of similarity between the first word and one or more other words;
   calculating an additional degree of similarity between the second word and the one or more other words; and
   determining a symmetry score between the first word and the second word based on the additional degrees of similarity of the first word and the second word, and wherein the updating is further based on the symmetry score.

3. The method of claim 1, further comprising:
outputting the degree of similarity in association with the first word and the second word; and
receiving a user request to add a relationship between the first word and the second word to the facet tree, and
wherein the updating includes adding the relationship between the first word and the second word to the facet tree in response to the user request.

4. The method of claim 1, further comprising:
producing statistical information about the one or more documents by counting words of interest in the annotated documents, wherein the statistical information comprises a count for a word of interest in at least one document.

5. The method of claim 1, further comprising:
assigning each of the one or more documents to one or more of a plurality of subgroups according to a category or classification value of a document, and
wherein the determining comprises calculating the degree of similarity in a
subgroup of the plurality of subgroups based on similarity of usage of the first word and the second word in the subgroup, and
wherein the updating comprises updating the facet tree based on the degree of similarity in the subgroup.

6. A computer program product for generating a facet tree, the computer program product comprising a computer readable storage medium having program instructions embodied therewith, wherein the computer readable storage medium is not a transitory signal per se, the program instructions executable by a computer to cause the computer to perform a method comprising:
detecting one or more surrounding words appearing with a first word in one or more documents,
detecting one or more surrounding words appearing with a second word in the one or more documents,
comparing the one or more surrounding words of the first word with the one or more surrounding words of the second word,
calculating the degree of similarity between the first word and the second word based on the comparing;
generating a facet tree based on the degree of similarity between the first word and the second word, the facet tree being a tree data structure that defines hierarchical relationships between a plurality of words;
generating an annotator based on the facet tree, the annotator being a software process that adds annotations to words in the one or more documents according to the hierarchical relationships defined in the facet tree; and
adding annotations to words in the one or more documents using the annotator, thereby producing one or more annotated documents.

7. The computer program product of claim 6, further comprising:
calculating an additional degree of similarity between the first word and one or more other words;
calculating an additional degree of similarity between the second word and the one or more other words; and
determining a symmetry score between the first word and the second word based on the additional degrees of similarity of the first word and the second word, and
wherein the updating is further based on the symmetry score.

8. The computer program product of claim 6, further comprising:
outputting the degree of similarity in association with the first word and the second word; and
receiving a user request to add a relationship between the first word and the second word to the facet tree, and
wherein the updating includes adding the relationship between the first word and the second word to the facet tree in response to the user request.

9. The computer program product of claim 6, further comprising:
producing statistical information about the one or more documents by counting words of interest in the annotated documents, wherein the statistical information comprises a count for a word of interest in at least one document.

10. The computer program product of claim 6, further comprising:
assigning each of the one or more documents to one or more of a plurality of subgroups according to a category or classification value of a document, and
wherein the determining comprises calculating the degree of similarity in a
subgroup of the plurality of subgroups based on similarity of usage of the first word and the second word in the subgroup, and
wherein the updating comprises updating the facet tree based on the degree of similarity in the subgroup.

11. A system for generating a facet tree, the system comprising:
one or more computer processors;
one or more computer-readable storage media;
program instructions stored on the computer-readable storage media for execution by at least one of the one or more processors, the program instructions comprising:
instructions to detect one or more surrounding words appearing with a first word in one or more documents,
instructions to detect one or more surrounding words appearing with a second word in the one or more documents,
instructions to compare the one or more surrounding words of the first word with the one or more surrounding words of the second word,
instructions to calculate the degree of similarity between the first word and the second word based on the comparing;
instructions to generate a facet tree based on the degree of similarity between the first word and the second word, the facet tree being a tree data structure that defines hierarchical relationships between a plurality of words;
instructions to generate an annotator based on the facet tree, the annotator being a software process that adds annotations to words in the one or more documents according to the hierarchical relationships defined in the facet tree; and
instructions to add annotations to words in the one or more documents using the annotator, thereby producing one or more annotated documents.

12. The system of claim 11, further comprising:
instructions to calculate an additional degree of similarity between the first word and one or more other words;
instructions to calculate an additional degree of similarity between the second word and the one or more other words; and instructions to determine a symmetry score between the first word and the second word based on the additional degrees of similarity of the first word and the second word, and wherein the updating is further based on the symmetry score.

13. The system of claim 11, further comprising:

instructions to output the degree of similarity in association with the first word and the second word; and instructions to receive a user request to add a relationship between the first word and the second word to the facet tree, and wherein the updating includes adding the relationship between the first word and the second word to the facet tree in response to the user request.

14. The system of claim 11, further comprising:

producing statistical information about the one or more documents by counting words of interest in the annotated documents, wherein the statistical information comprises a count for a word of interest in at least one document.

15. The system of claim 11, further comprising:

instructions to assig each of the one or more documents to one or more of a plurality of subgroups according to a category or classification value of a document, and wherein the determining comprises calculating the degree of similarity in a subgroup of the plurality of subgroups based on similarity of usage of the first word and the second word in the subgroup, and wherein the updating comprises updating the facet tree based on the degree of similarity in the subgroup.

* * * * *